United States Patent [19]

Maddox

[11] Patent Number: 5,102,282

[45] Date of Patent: Apr. 7, 1992

[54] UNIT LOAD TRANSFER DEVICE AND METHOD

[75] Inventor: Harry B. Maddox, Cincinnati, Ohio

[73] Assignee: The Procter & Gamble Company, Cincinnati, Ohio

[21] Appl. No.: 595,127

[22] Filed: Oct. 9, 1990

[51] Int. Cl.⁵ .............................................. B65G 57/00
[52] U.S. Cl. ................................. 414/404; 414/786; 414/417; 414/927; 414/928; 414/929
[58] Field of Search ............. 414/403, 404, 417, 425, 414/661, 778, 773, 786, 927, 928, 929

[56] References Cited

U.S. PATENT DOCUMENTS

| | | | |
|---|---|---|---|
| 2,394,693 | 2/1946 | Golrick | 414/417 x |
| 2,412,155 | 12/1946 | Jessen | 414/661 X |
| 2,574,394 | 11/1951 | Isler | 414/417 x |
| 3,123,232 | 3/1964 | Postlewaite | 414/929 X |
| 3,151,753 | 10/1964 | Verrinder et al. | 414/786 |
| 3,181,712 | 5/1965 | Von Gal, Jr. | |
| 3,197,053 | 7/1965 | Faust | 414/661 |
| 3,241,692 | 3/1966 | Johnson | 414/789.1 |
| 3,269,565 | 8/1966 | Kemp, Jr. | 414/417 X |
| 3,327,872 | 6/1967 | Madden | 414/929 X |
| 3,438,525 | 4/1969 | Nutter . | |
| 3,448,867 | 6/1969 | Raynor et al. . | |
| 3,595,415 | 7/1971 | Herd . | |
| 3,616,951 | 11/1971 | St. Clari | 414/417 |
| 3,645,409 | 2/1972 | Sinclair | 414/417 X |
| 3,782,562 | 1/1974 | Burt et al. | 414/929 X |
| 3,831,782 | 8/1974 | Werntz | 414/927 X |
| 4,324,523 | 4/1982 | Zablocky | 414/417 X |
| 4,482,286 | 11/1984 | Farmer et al. | 414/661 X |
| 4,557,656 | 12/1985 | Ouellette | 414/929 X |
| 4,606,690 | 8/1986 | Svendsen | 414/661 X |
| 4,655,672 | 4/1987 | Sinclair et al. | 414/661 |
| 4,764,074 | 8/1988 | Postigo | 414/795.2 |
| 4,889,463 | 12/1989 | Frost et al. | 414/929 X |
| 4,988,264 | 1/1991 | Winski | 414/417 X |
| 4,993,907 | 2/1991 | Clark | 414/927 X |
| 4,995,785 | 2/1991 | Platteschorre | 414/661 X |
| 5,037,047 | 8/1991 | Chanko | 414/778 X |
| 5,606,690 | 8/1986 | Svendsen | 414/661 X |

Primary Examiner—David A. Bucci
Assistant Examiner—James Keenan
Attorney, Agent, or Firm—Richard C. Witte; E. Kelly Linman; Thomas H. O'Flaherty

[57] ABSTRACT

An apparatus and method for transferring a unit load from one pallet to another pallet or slip sheet without creasing the containers constituting the unit load. In one embodiment the unit load containing pallet and the empty pallet are aligned side-by-side on a platform. The platform is selectively moveable about an axis parallel to the adjacent sides of the pallets between a horizontal position and a tilted position in which the empty pallet is lowermost. A push plate moveable relative to the platform transfers the unit load onto the empty pallet or slip sheet while the platform is tilted. The force required to transfer the unit load is reduced, when contrasted to horizontal transfer, since the component forces of the unit load are changed by the tilting.

19 Claims, 21 Drawing Sheets

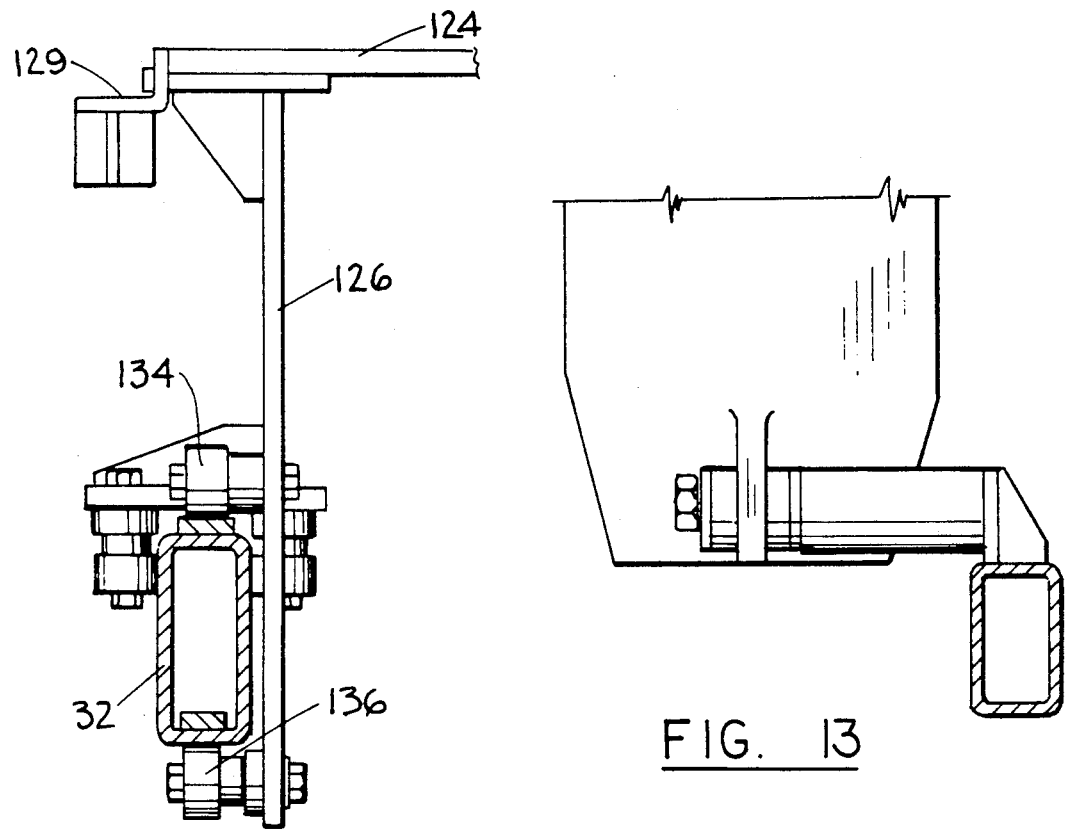
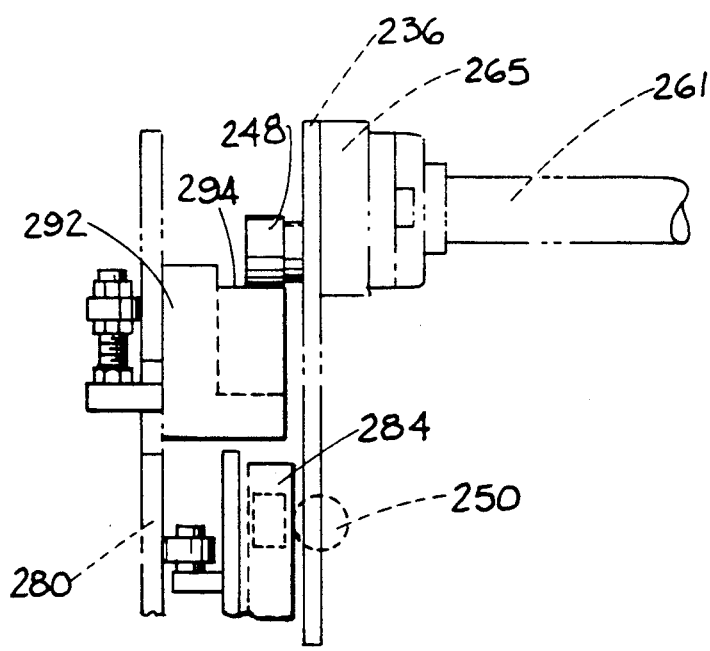
FIG. 12
FIG. 13
FIG. 14

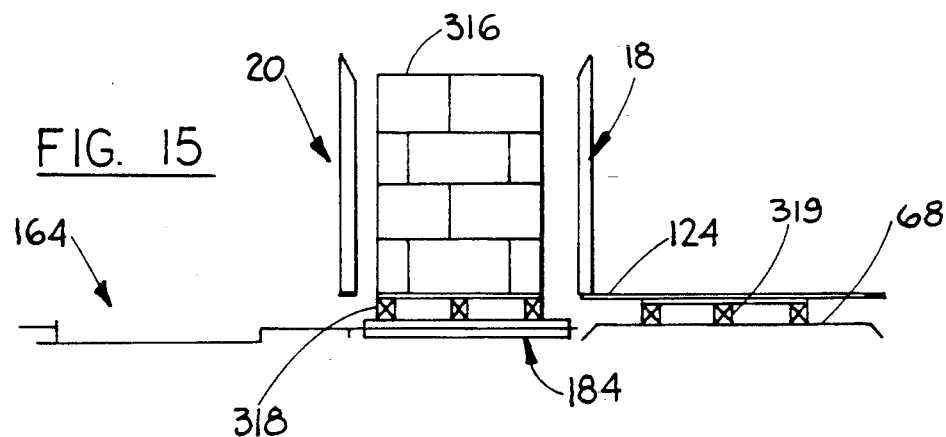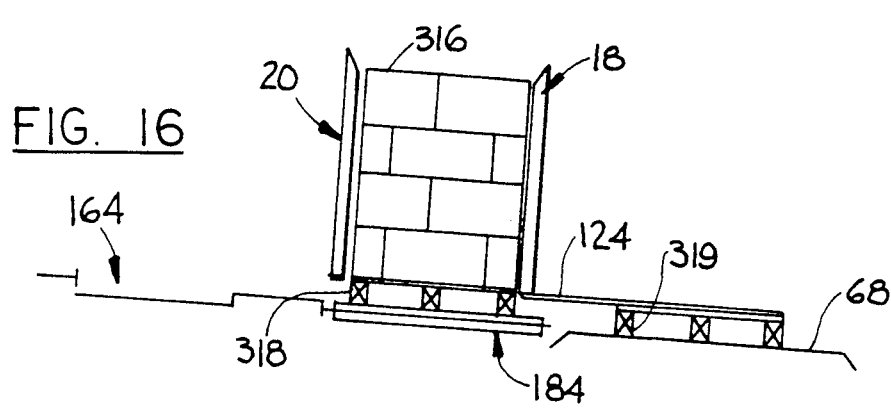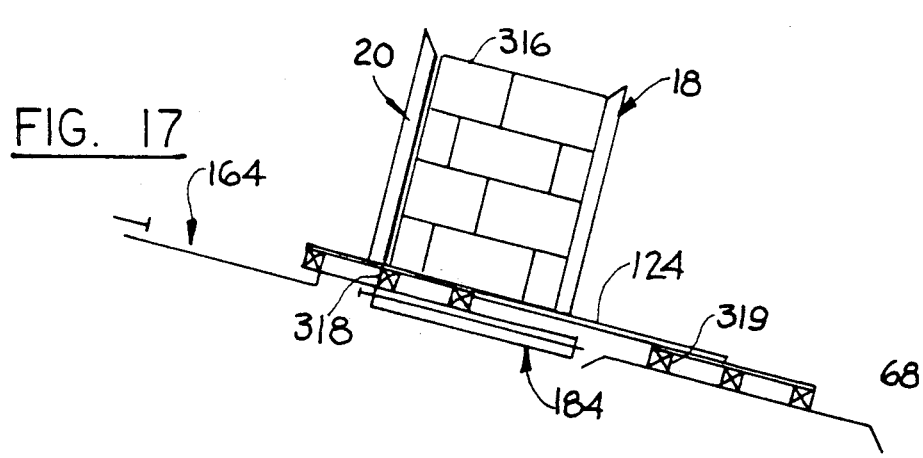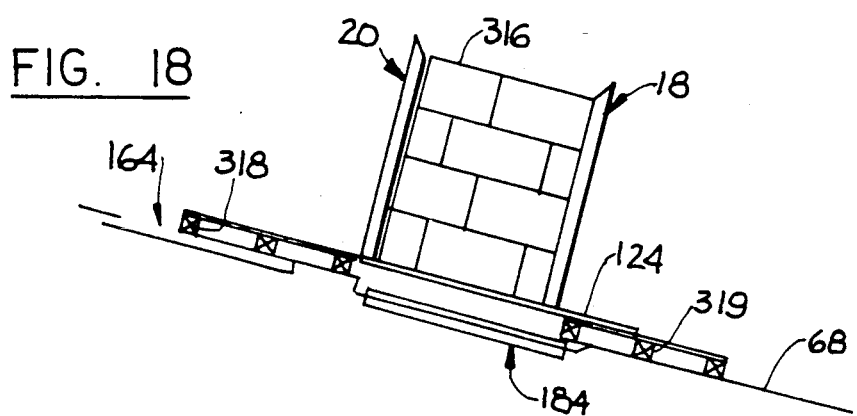

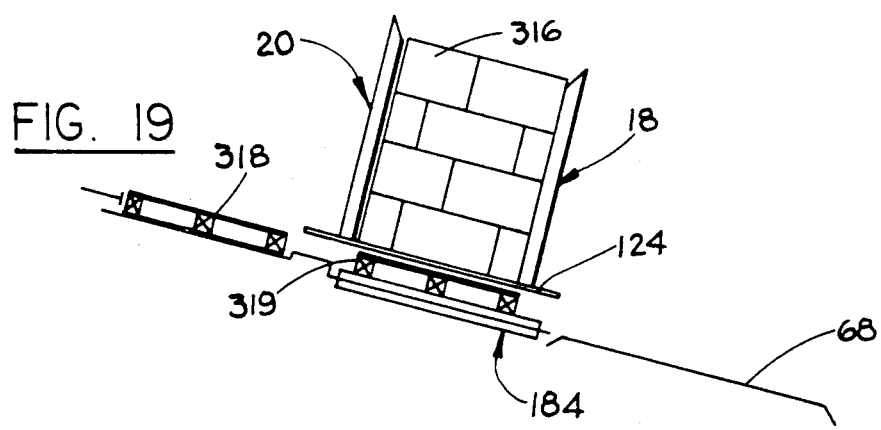
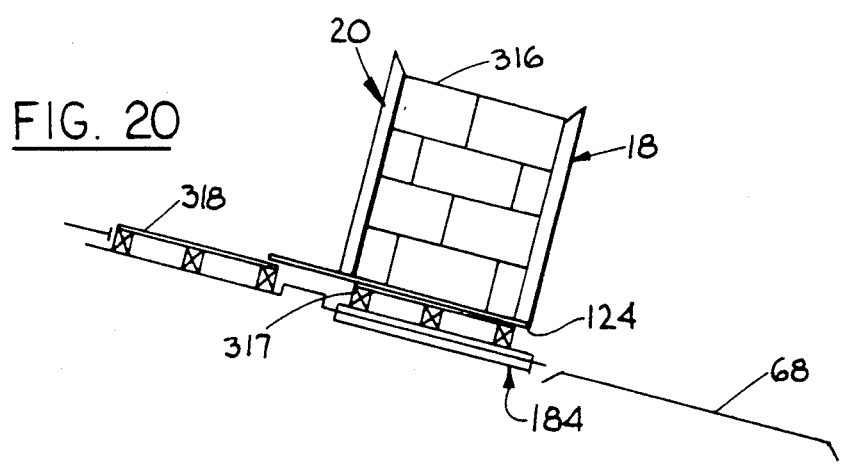
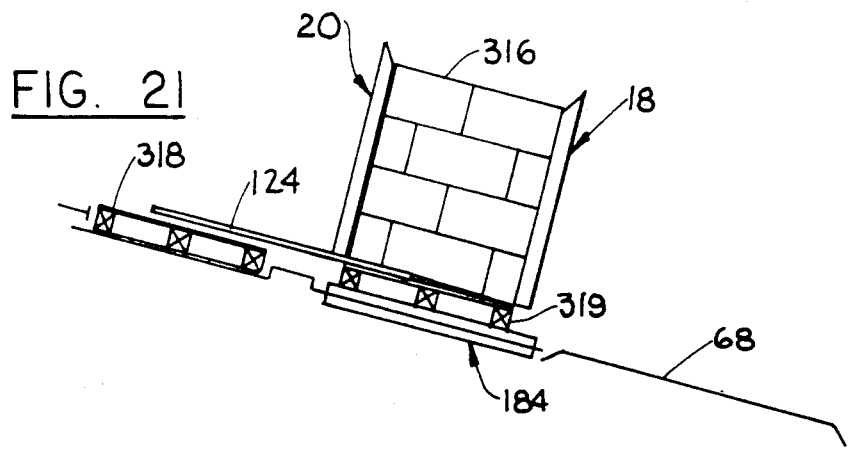
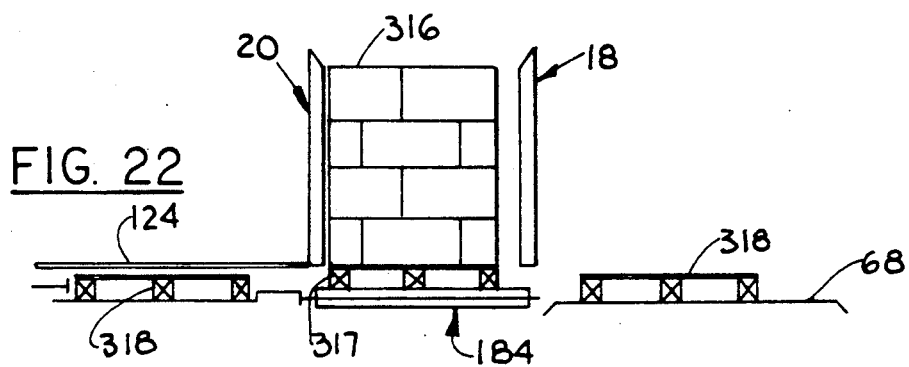

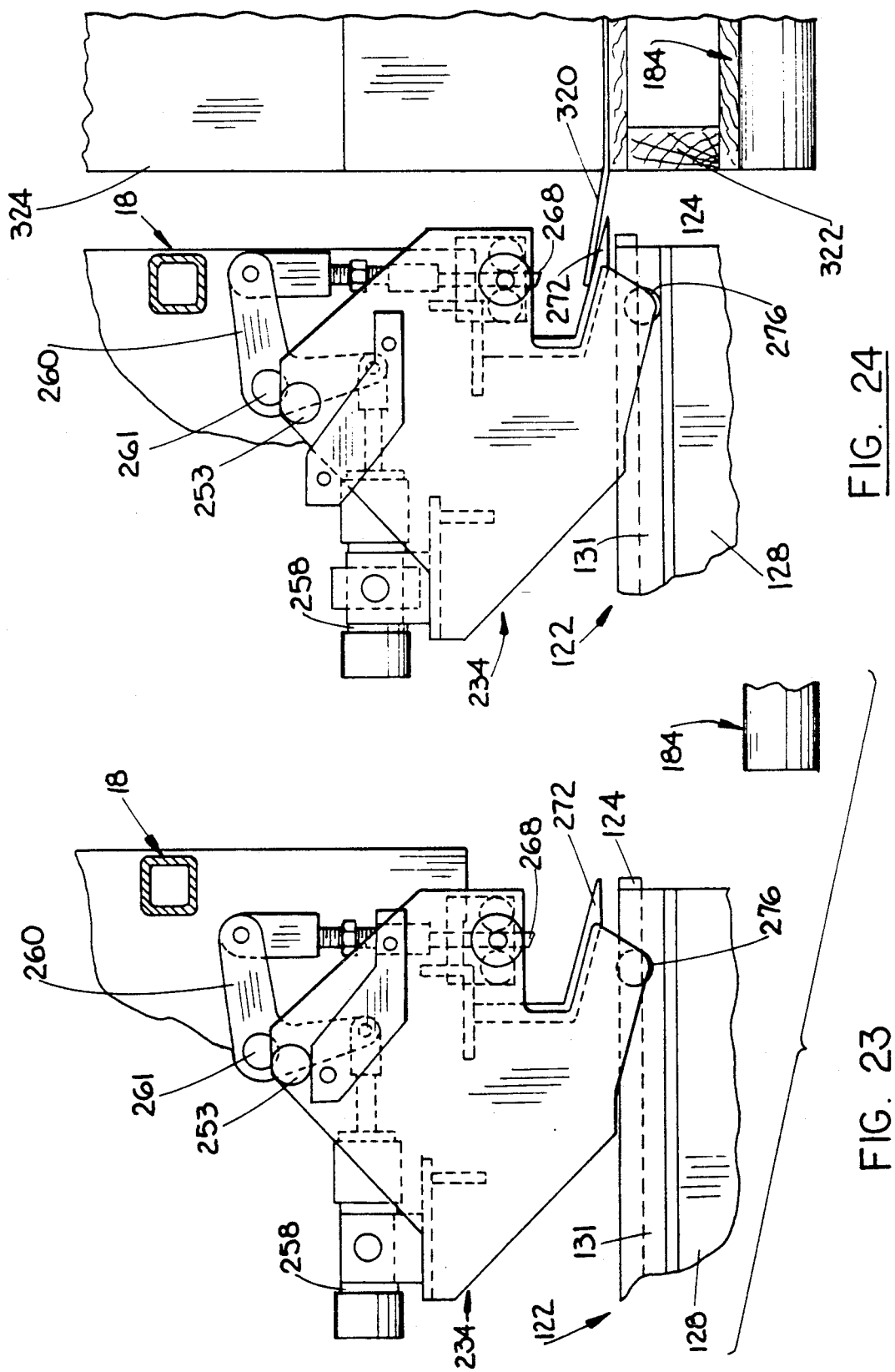

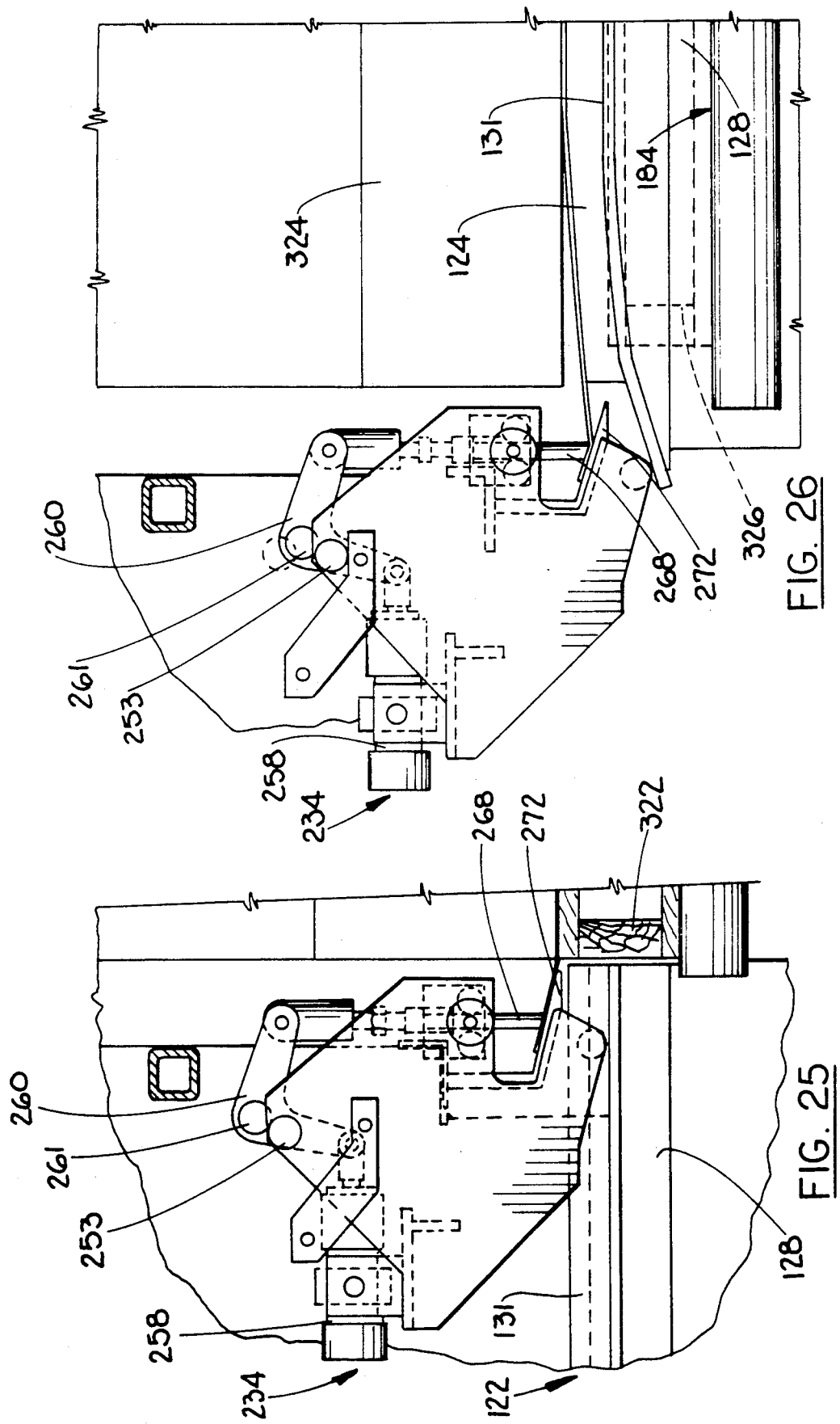

UNIT LOAD TRANSFER DEVICE AND METHOD

FIELD OF THE INVENTION

The present invention relates to an apparatus that transfers a unit load from one pallet to another pallet, with or without a slip sheet or to a slip sheet only, while in a tilted position to reduce the force required to move the unit load without damaging the unit load itself.

BACKGROUND INFORMATION

Manufacturers of consumer goods face enormous costs for goods damaged during shipping and handling. The consumer goods are frequently shipped in corrugated containers where the corrugation acts as a support for the load of other containers when stacked on top of each other. Clamp trucks are often used to move these corrugated containers around the warehouse and onto trucks that ship the goods. The clamp trucks have opposed solid plates that squeeze a load of corrugated containers with enough force to suspend the containers therebetween as the load is transported intact. The edges of the steel plates of the clamp trucks can crease the corrugated containers, reducing top load strength. This reduction in strength frequently causes the container to fail when top loaded, resulting in increased costs due to damaged goods.

Manufacturers can avoid the clamp truck problem by placing the load of corrugated containers upon wooden pallets and transferring them using fork trucks. The corrugated containers are initially stacked on captive pallets, a high quality pallet retained by the manufacturer for repeated use, for storage in the warehouse. Before shipping, the manufacturer will transfer the load from the captive pallet to a shipping pallet. The captive pallet can then be re-used by the manufacturer and the shipping pallet containing the load is placed on a truck for transport. Existing load transfer machines are often inefficient and can damage the load while transferring the load from pallet to pallet.

U.S. Pat. No. 3,123,232 issued to Postlewaite on Mar. 3, 1964, discloses a mechanism in which a load stacked upon a first pallet is securely held between a pair of opposing clamps and tilted over 90° where the first pallet is removed and replaced with a second pallet. The second pallet and the load are then returned to an upright position. The method of the Postlewaite patent is unsuitable for many kinds of loads.

U.S. Pat. No. 3,645,409 issued to Sinclair on Feb. 29, 1972, discloses a load transfer and pallet stacker which is used to transfer a unit load from a pallet to the platens of a lift truck. Although the load may then be transferred to another pallet from the lift truck, the procedure is cumbersome and inefficient.

U.S. Pat. No. 3,269,565, issued to Kemp on Aug. 30, 1966, discloses an apparatus for transferring palletized loads by lifting the load off one pallet, removing the old pallet, and then placing a replacement pallet under the load and then lowering the load onto the replacement pallet. The Kemp patent is not practical for use if the pallets are not of a consistent structure, design and quality to enable the lift fingers to slide between the slots of the pallets. The load may be damaged if it is of such a nature that it can not withstand the resulting force placed upon it by the fingers.

SUMMARY OF THE INVENTION

It is an object of this invention to provide a method and apparatus for transferring a unit load from a captive pallet to a shipping pallet.

It is a further object of this invention to provide a method and apparatus for transferring a unit load from a captive pallet to a shipping pallet without creasing the containers constituting the unit load.

It is a further object of this invention to provide a method and apparatus for transferring a unit load with or without a slip sheet on a captive pallet to a shipping pallet with or without a slip sheet or to a slip sheet only.

It is a further object of this invention to provide a method and apparatus to transfer a unit load from a captive pallet to a shipping pallet to enable the manufacturer to retain possession of high quality captive pallets for re-use.

It is a further object of this invention to accomplish the foregoing while reducing the overall costs involved.

The aforementioned and other objects of the invention will become more apparent hereinafter.

In accordance with one aspect of the invention, there is provided an apparatus for transferring a unit load from a first support surface to a second support surface. A platform associated with both support surfaces is adapted to maintain a generally parallel, adjacent and aligned relationship between the two support surfaces. The platform is selectively moveable about a horizontal axis that is generally parallel to one side of the unit load. The platform moves between a horizontal position and a tilted position where the first support surface is higher than the second support surface. There is a pushing means that is operative when the platform is tilted. The pushing means is adapted to cause relative movement of the unit load with respect to the first support surface, in the direction of the lower end of the platform. The unit load is transferred to the second support surface as the unit load moves off the lower end of the first support surface.

In accordance with another aspect of the present invention, there is provided a method for transferring a unit load from a first support surface to a second support surface. The first and second support surfaces are positioned on a platform such that they are parallel, adjacent and aligned. The platform is moved about a horizontal axis that is generally parallel to one side of the unit load. A dynamic force is applied to either the unit load or the first support surface to cause relative movement of the unit load. This force transfers the unit load from the first support surface to the second support surface. The force required to produce such relative movement is reduced by tilting as contrasted with that which would be required in a horizontal plane.

BRIEF DESCRIPTION OF THE DRAWINGS

While the specification concludes with claims particularly pointing out and distinctly claiming the subject invention, it is believed that the same will be better understood from the following description taken in conjunction with the accompanying drawings in which:

FIG. 12 is an enlarged partial view taken along line 12—12 of FIG. 5.

FIG. 13 is an enlarged partial view taken along line 13—13 of FIG. 6.

FIG. 14 is an enlarged partial view taken along line 14—14 in FIG. 10.

FIGS. 15—22 are sequential schematic depictions of the operation of the pallet load transfer device depicted in FIGS. 1-14 transferring a load from a captive pallet having no slip sheet to a shipping pallet.

FIGS. 23-26 are sequential depictions of the gripper assembly of FIGS. 7-9 operating to grip a slip sheet during transfer of a load from a captive pallet having a slip sheet to the push plate of the pallet load transfer device.

DESCRIPTION OF THE PREFERRED EMBODIMENTS

Figure 1:
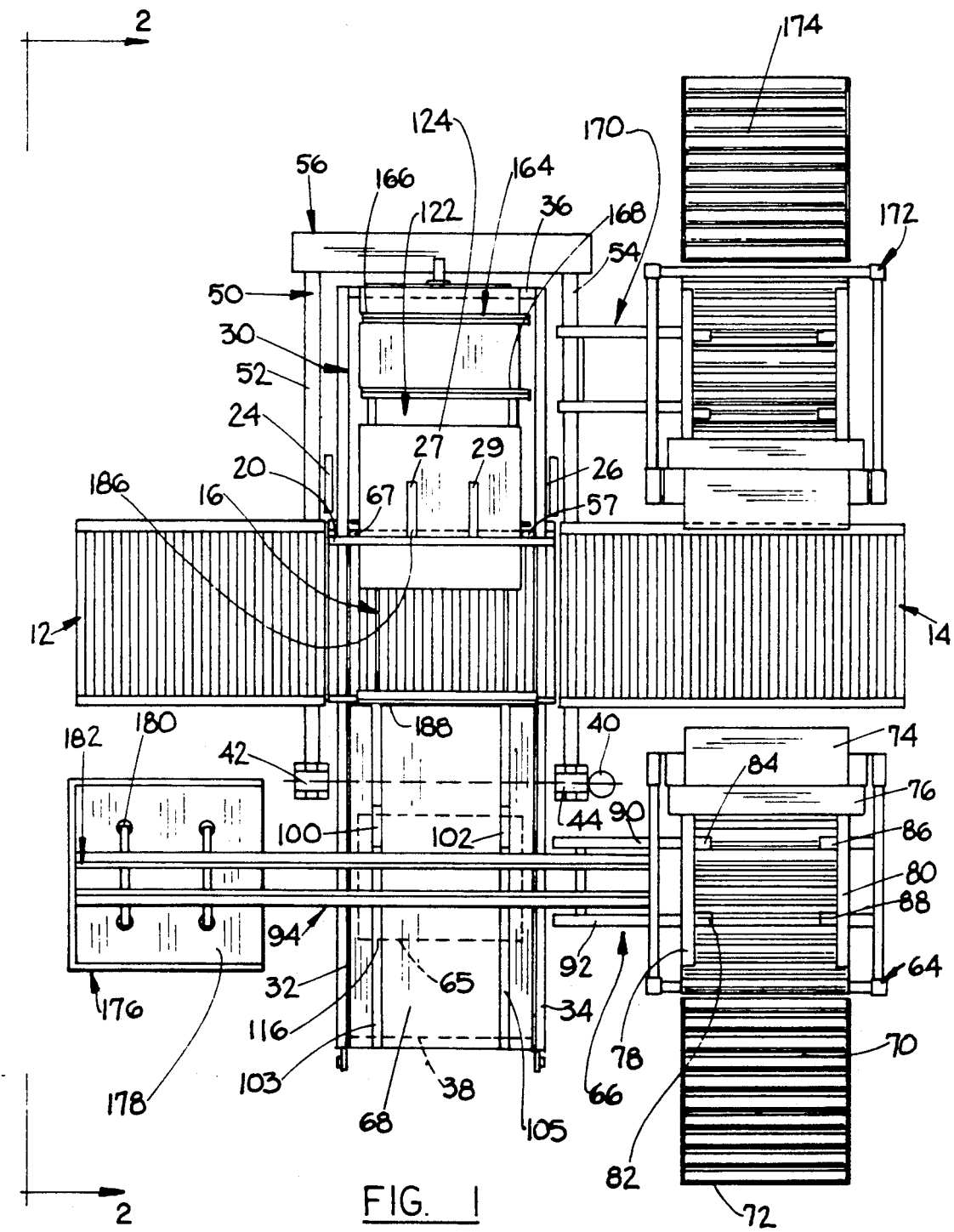
FIG. 1 is a somewhat schematic top plan view of a pallet load transfer device constructed in accordance with the present invention.
Figure 2:
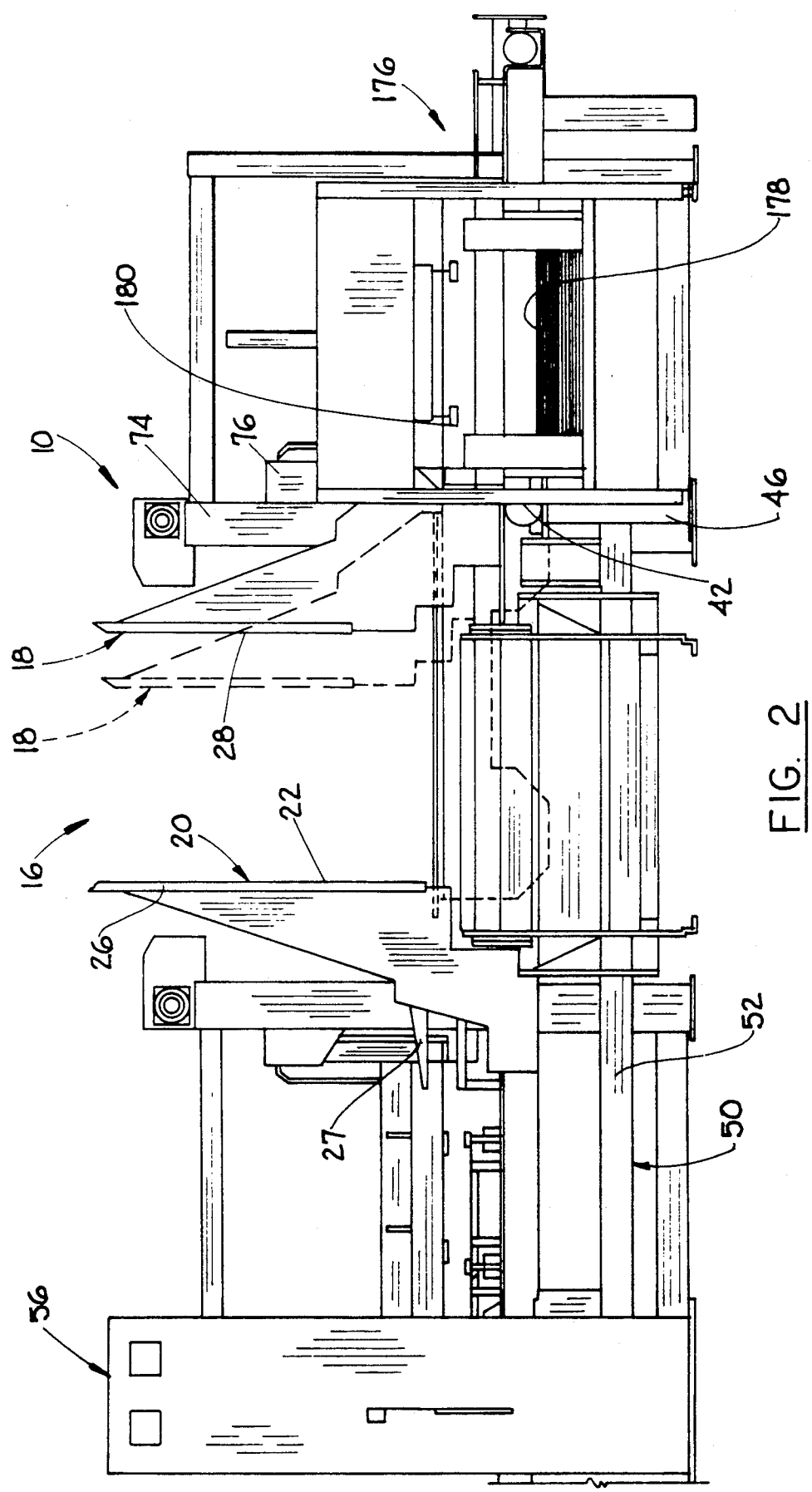
FIG. 2 is a side elevational view of the pallet load transfer device of FIG. 1 taken along line 2—2 in FIG. 1.

Turning now to FIGS. 1-3, indicated generally at 10 is a pallet transfer device constructed in accordance with the present invention. Device 10 includes an in-feed conveyor 12, an out-feed conveyor 14 and a pallet transfer bay 16 disposed between the in-feed and out-feed conveyors. Speaking only generally in terms of the operation of pallet transfer device 10, a captive wooden pallet (not shown in FIGS. 1-3) supporting a plurality of containers, which comprise the unit load, is placed on in-feed conveyor 12, typically by a fork lift (also not shown). The in-feed conveyor stages the unit load and pallet thereon to pallet transfer bay 16. In the transfer bay, device 10 operates in a manner to transfer the unit load onto a slip sheet or onto a shipping pallet which may or may not have a slip sheet thereon.

After so transferring the unit load, device 10 stages the unit load and the pallet and or slip sheet supporting the same onto out-feed conveyor 14. From there the transferred unit load and shipping pallet (and/or slip sheet) supporting the same are removed as a unit (typically by a fork lift) and placed on a shipping carrier such as a truck.

Consideration will now be given first to the other main subassemblies which make up device 10 and then to the detailed structure of each subassembly and the overall operation of pallet load transfer device 10.

Pallet transfer bay 16 is defined between a retainer assembly 18 (not shown in FIG. 1 to reveal additional structure) and a backstop 20. Backstop 20 includes a vertical plate 22 which extends from the top to the bottom thereof and between a pair of opposed sides 24, 26 (in FIG. 1). Similarly, retainer assembly 18 also includes a vertical plate 28 opposite plate 22.

Backstop 20 is fixedly mounted on a tilt frame 30. The tilt frame is comprised of a pair of opposed parallel rails 32, 34 connected at either end thereof by a pair of opposed parallel end beams 36, 38. Tilt frame 30 is pivotable about a pivot axis 40, shown in dashed liens in FIG. 1. Tilt frame 30 is pivoted from its horizontal position (in FIG. 2) to a tilted position (in FIG. 3).

Pivoting about axis 40 is accomplished by pivot bearings 42, 44 which are supported on vertical posts 46, 48, respectively. Posts 46, 48 comprise a portion of a support frame 50 which further includes a pair of opposed parallel frame rails 52,54 each having one end connected to posts 46, 48, respectively, with the other end of each being connected to an upright tilt housing 56.

Retainer assembly 18 is indirectly mounted on tilt frame 30 via a roller assembly (shown on rails 32, 34 in FIG. 4) which permits movement of assembly 18 toward and away from backstop 20 responsive to the extension and contraction of a ram 41. The position assumed by retainer assembly 18 when ram 41 is fully extended is illustrated in dashed lines in FIG. 2.

Considering now FIGs. 2A and 2B, indicated generally at 57 is a load stop for stopping a load staged into pallet transfer bay 16 in a manner which will be hereinafter described. The load stop is mounted on a lower portion of backstop 20 and is also viewable in the plan view of FIG. 1. Load stop 57 includes an arm 59 which is shiftable vertically, under action of a ram 61, and pivotable, under action of a ram 63. The arm is shown in its upper retracted position in dashed lines in FIG. 2A. Briefly stated, when a load is staged into the transfer bay, ram 61 lowers the arm, from the dashed line position in FIG. 2A, and ram 63 pivots it so that it extends into the transfer bay from beneath the backstop. In this position the arm is located as shown in solid lines in FIGs. 2A and 2B. The load hits the arm which stops further load movement and thus positively positions the load for additional operations.

A load clamp 67 (in FIG. 1) is constructed and operates in the same fashion as load stop 57 except that it is a mirror image of load stop 57. Thus, in FIG. 1, after the load stop pivots into the transfer bay, as described above, the load clamp pivots into the transfer bay, from the opposite direction, against the rear of the load. Clamps 57, 67 thus briefly clamp the load thereby positively positioning the same in the transfer bay.

Figure 3A:
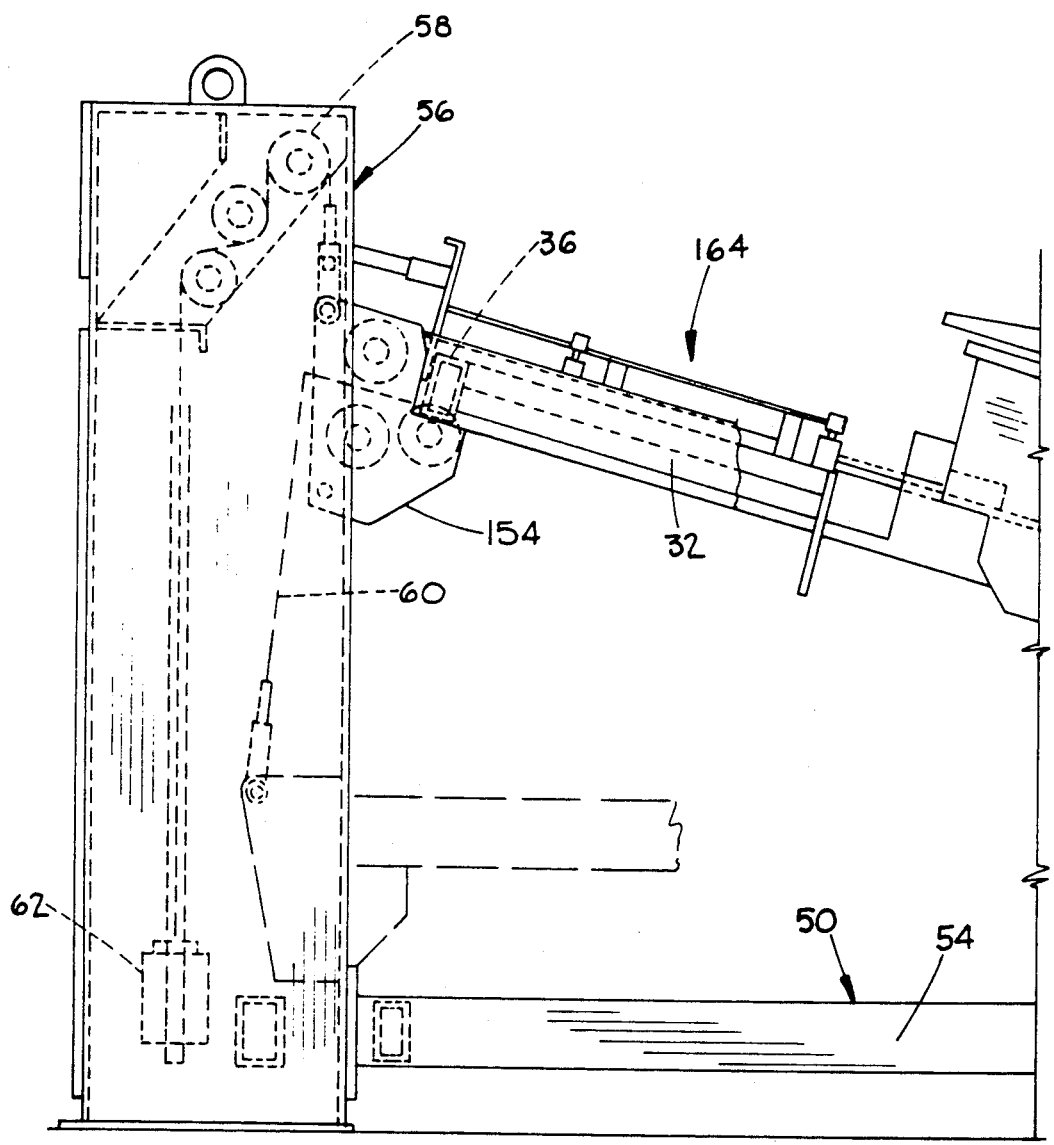
FIGS. 3A, 3B and 3C are successive continuations of an enlarged view, portions of which are broken away, of the tilt frame (in its tilted condition) and associated structure of the pallet load transfer device of FIG. 2.

Tilt housing 56 includes a motor for driving a gear system 58, in FIG. 3A, having a chain 60 engaged therewith. One end of chain 60 is connected to the end of tilt frame 30 as shown with the other end being connected to a counter-weight 62. Operation of the motor turns gears 58 thus elevating and lowering tilt frame 30.

Prior to describing additional structure supported on tilt frame 30, description will be made of a shipping pallet dispenser, indicated generally at 64 in FIG. 1, and a dispenser transfer conveyor indicated generally at 66. Dispenser 64 and conveyor 66 operate in a manner which will be more fully explained hereinafter to shift shipping pallets, one at a time, from dispenser 64 onto a slider bed 68 mounted on tilt frame 30. A shipping pallet 65 is shown in dashed lines on slider bed 68 in the position to which it is so shifted.

Shipping pallet dispenser 64 includes a plurality of motor-driven rollers 70 upon which a stack of shipping pallets (not shown) may be placed from a free end 72 of rollers 70, typically by a fork lift. Dispenser 64 includes an upright tower 74 (in FIGs. 1 and 2) having a vertically shiftable member 76 mounted thereon. Member 76 has a pair of arms 78, 80 (not visible in FIG. 2) which extend laterally therefrom. Each arm includes elongate members mounted on the underside thereof which extend downwardly from the arm which are thus obscured by arms 78, 80 in the view of FIG. 1. Each elongate member includes a pallet lift finger 82, 84, 86, 88 mounted at the lower end thereof at right angles thereto. Arm 78, 80 are each rotatable about the longitudinal axis thereof.

It can thus be seen that with member 76 at an appropriate elevation, a stack of shipping pallets received on dispenser 64 from end 72 is shifted, under power of rollers 70, from end 72 to a position in which fingers 82, 84 are on one side of the stack and fingers 86, 88 are on the other side. With the stack so positioned, arms 78, 80 are each rotated about their longitudinal axis to insert fingers 82-88 into the open sides of the second pallet from the bottom of the stack. With the fingers so positioned, arm 76 is raised thus leaving only the lowermost pallet resting on rollers 70.

When so configured, dispenser transfer conveyor 66 is actuated to convey the single shipping pallet on rollers 70 laterally onto slider bed 68. Conveyor 66 includes a pair of vertically shiftable endless chains 90, 92. The conveyor has an upper position in which the chains protrude just above the level of rollers 70 and a lower position in which the chains are just beneath the upper surface of the rollers. With the chains in their lowered position, a pallet resting on rollers 70 may be staged into a position above chains 90, 92. When the chains raise, the pallet is supported on the chain. Chain rotation thus shifts the pallet laterally toward slider bed 68. A pivoting arm (not shown) mounted on dispenser 64 shoves a shipping pallet which is partly supported on chains 90, 92 and partly supported on bed 68 to the left (in FIG. 1) against a pair of stops (also not shown) for positively positioning a shipping pallet on slider bed 68 in the position of pallet 65.

Figure 3B:
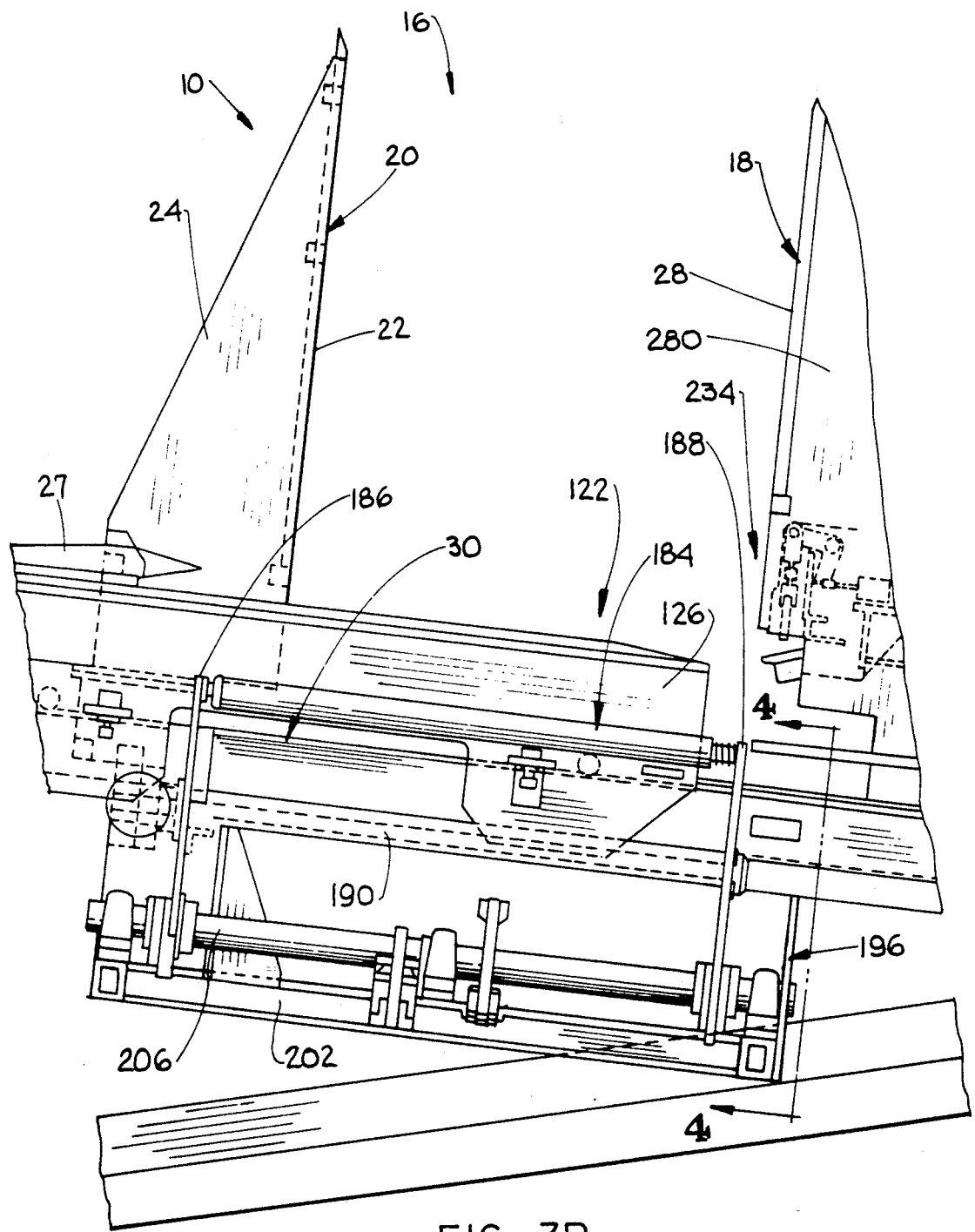
Figure 3D:
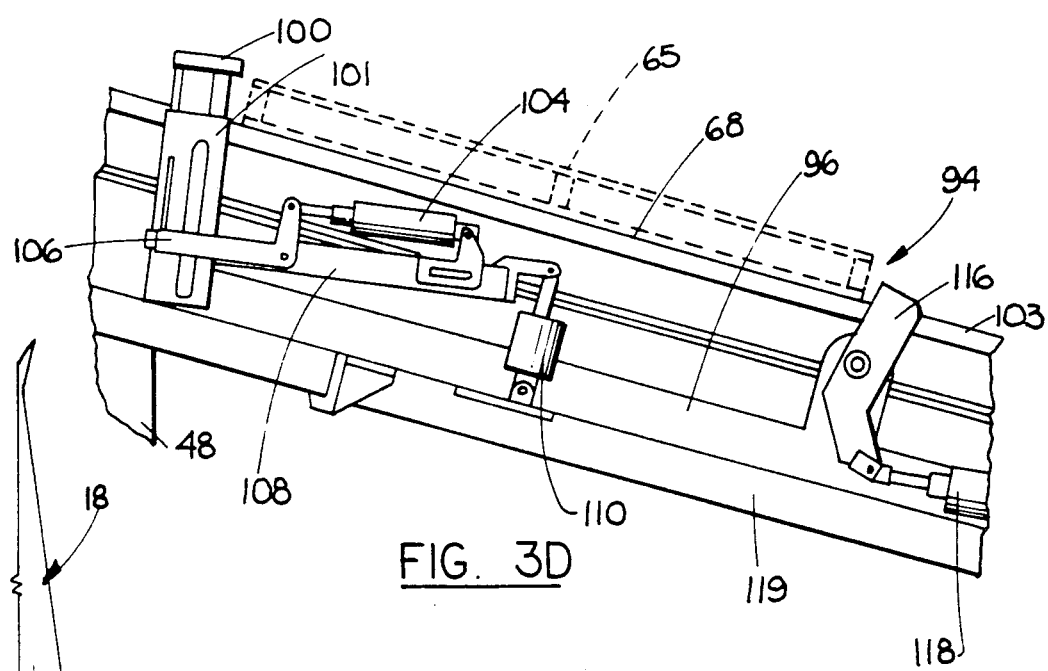
FIG. 3D is a view similar to FIG. 3C with the slip sheet clamps and pallet pushing lugs pivoted from the positions shown in FIG. 3C.
Figure 3C:
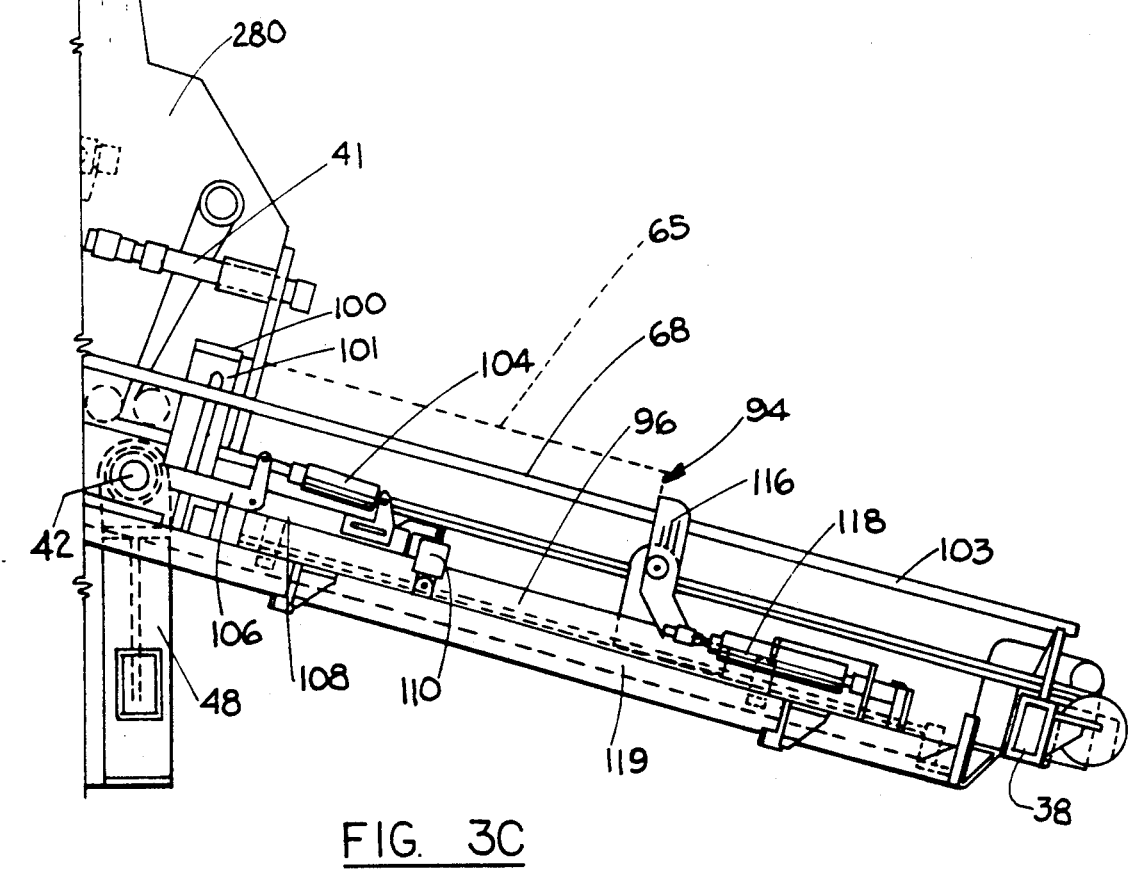
Figure 4:
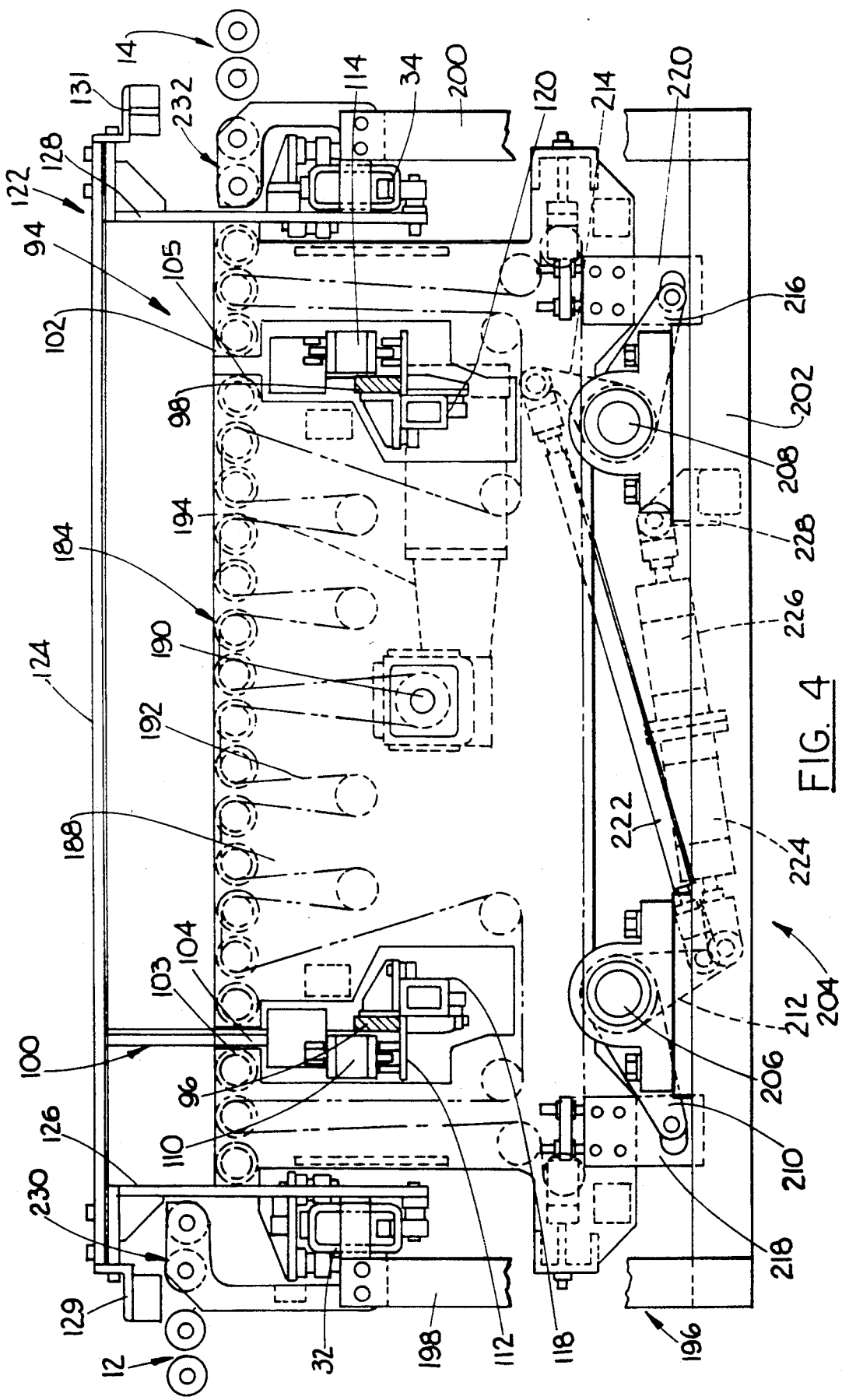
FIG. 4 is an enlarged partial view taken along line 4—4 in FIG. 3B with the clamp assembly carriage extended part way into the transfer bay.

Considering now FIGs. 1, 3C and 4, indicated generally at 94 is a clamp assembly carriage. As will become apparent, clamp assembly carriage 94 functions to transfer a shipping pallet from slider bed 68 into pallet transfer bay 16. Clamp assembly carriage 94 includes a clamp assembly frame which comprises a pair of parallel elongate frame members 96, 98 which are rigidly connected at their ends by parallel frame members (not visible) thus forming a rectangular frame.

A clamp assembly, including clamps 100, 102 are mounted on frame members 96, 98, respectively. Each clamp is received in a clamp sleeve, like clamp 100 is received in sleeve 101. Each clamp is vertically retractable into and out of its associated sleeve. In the view of FIG. 4, clamp 100 is shown in its extended or uppermost position with clamp 102 being shown in its contracted or lowermost position to illustrate the range of clamp travel. As will later be seen in connection with the description of operation, the clamps extend and retract from their respective sleeves in synchrony; the view of FIG. 4 is for the purpose of illustration only.

Slots 103, 105, also viewable in FIG. 1, are formed in slider bed 68 to permit clamps 100, 102 to extend upwardly above the surface of the slider bed, like clamp 100 in FIG. 4.

A pair of hydraulic rams, one of which is ram 104 in FIG. 3C extend and contract to effect raising and lowering of clamps 100, 102 relative to their associated clamp sleeves. As can be seen in FIG. 3C, ram 104 is pivotally connected to the end of one leg of a ring-angle linkage 106. The linkage is pivotally mounted on an elongate pivot member 108, in FIG. 3C, at the corner thereof. The end of linkage 104 opposite its connection to ram 104 is pivotally connected to the lower end of clamp 100 thereby raising and lowering the same responsive to ram contraction and extension, respectively. Another ram, like ram 104 is connected to clamp 102 in the same fashion and operates in synchrony with ram 104.

An air cylinder 110 has an upper end thereof pivotally attached to pivot member 108 and a lower end pivotally attached to a bracket 112 which is fixed to frame member 96. The leftmost end of member 108, which extends behind sleeve 101 is pivotally connected to carriage 94.

Air cylinder 110 is shown in the drawings in its contracted condition. When air cylinder 110 extends, the rightmost end of pivot member 108 pivots upwardly about the pivot point of member 108, which is at the left end of the pivot member, thereby tilting the clamp assembly, including clamp 100 and clamp sleeve 101 to the position shown in FIG. 3D. Similar structure, including air cylinder 114, is mounted on frame member 98 and moves clamp 102 in the same fashion.

In FIG. 3C, a pallet pushing lug 116 is pivotally mounted on a bracket which in turn is fixedly attached to frame member 96. A ram 118 is fixedly mounted on frame member 96 and has a rod which is pivotally mounted to lug 116. When ram 118 is contracted, it assumes a configuration shown in FIG. 3C and when extended, lug 116 pivots to the position in FIG. 3D.

A similar lug and ram, like lug 116 and ram 118, are mounted on frame member 98 but are not visible in FIG. 3C.

Speaking only briefly and generally of the operation of clamp assembly carriage 94, when pallet 65 is staged onto slider bed 68 as described above, clamps 100, 102 are pivoted forward to the position shown in FIG. 3D and the pallet pushing dogs, like dog 116, are pivoted to the right as also shown in FIG. 3D. With the clamps and dogs to positioned, shipping pallet 65 can be staged onto the slider bed through action of conveyor 66 and the pivot arm (not shown), as described above, to the position shown in dashed lines in FIGs. 1 and 3C. When so positioned, air cylinder 110 and ram 118 operate as described above to move the clamps, like clamp 100, and the dogs, like dog 116, to the upright position shown in FIG. 3C.

As can be seen in FIG. 4, the clamp assembly frame is rollingly mounted on a pair of opposed parallel frame rails 118, 120. A chain (not visible) has one end connected to the other end of the frame member. The chain is received over sprockets (also not visible), one of which is at the rightmost end of tilt frame 30 in FIG. 3C and the other of which is rotatably mounted beneath backstop 20. Frame member 98 is similarly connected to a chain and rotatable sprockets. A hydraulic motor (also not visible) is drivingly engaged via a gear with one of the chains thereby enabling movement of the frame assembly from the position shown in FIG. 3C to a position centered beneath pallet transfer bay 16.

As can be seen in FIGS. 1 and 4, there are spaces between adjacent transfer bay rollers which align with slots 103, 105 to permit the clamp sleeves, like clamp sleeve 101, to be driven between the rollers. When such driving occurs with a pallet positioned like pallet 65 in FIG. 1, the pallet is driving onto the rollers forming the base of transfer bay 16 and is generally centered between retainer assembly 18 and backstop 20.

A more detailed description of the manner in which the clamp assembly frame operates in conjunction with other structure included in pallet transfer device 10 is provided herein after further detailed description of additional structure.

Considering now FIGs. 1, 3 and 4–6, consideration will be given to the detailed structure of a push plate assembly indicated generally at 122. The push plate assembly 122 includes a rectangular push plate 124 and a pair of upright side plates 126, 128 which extend downwardly from the push plate parallel to one another.

Bearing tracks 129, 131 (in FIG. 4) are mounted on each side of plate 124 and accommodate a bearing roller which is described hereinafter.

Each side plate includes a pair of downwardly projecting portions, like portions 130, 132 (in FIG. 5), having rollers, like rollers 134, 136, mounted thereon. Rollers 134, 136, as do the rollers on projection portion 130, rollingly engage on rail 32. Side 128 of push plate assembly 122, in FIG. 4, in substantially identical and symmetrical to side 126 and includes similar projections having rollers thereon which ride upon rail 34.

Figure 5:
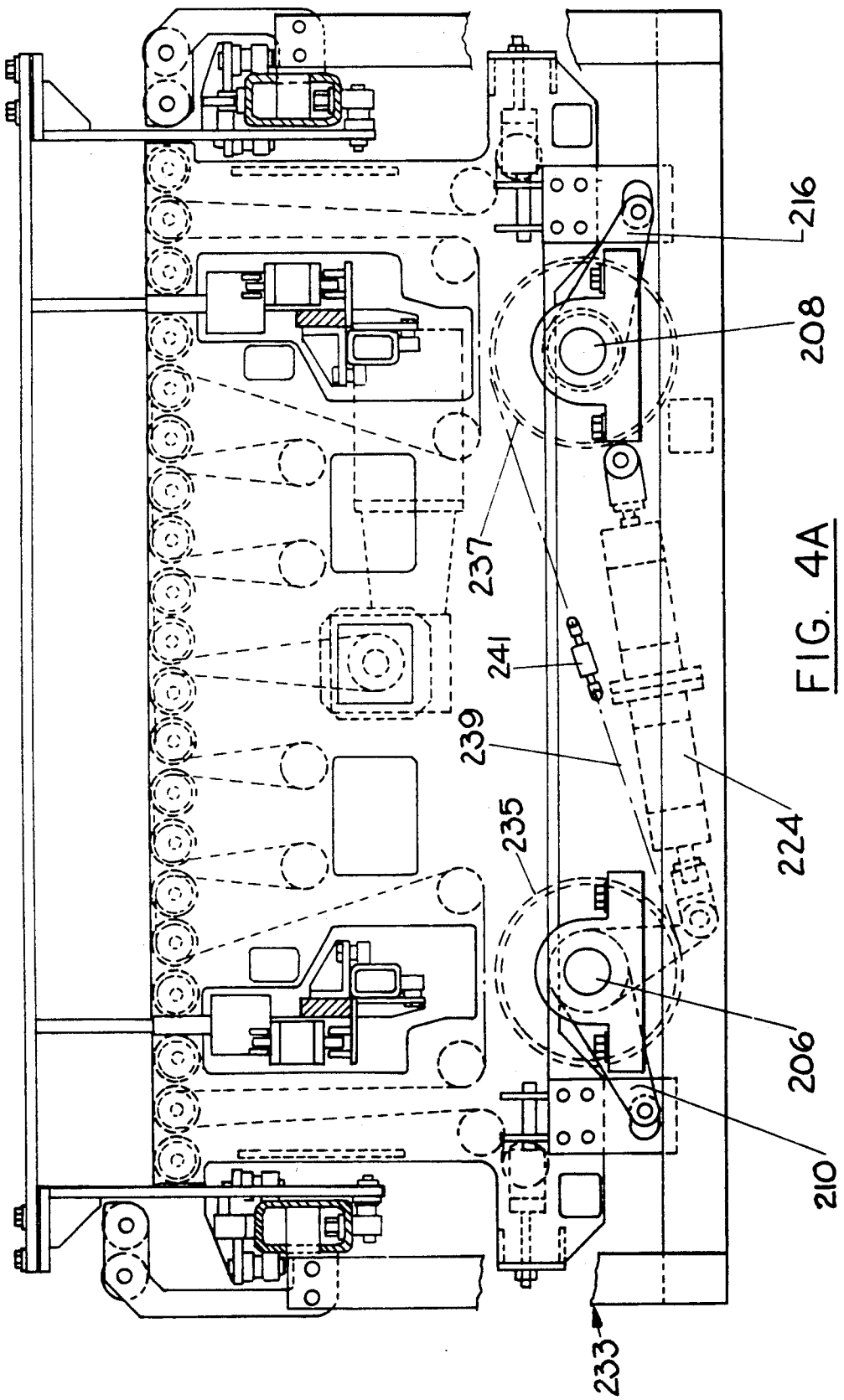
FIG. 5 is a partial view of the tilt frame (in its untilted condition) and the push plate of the pallet load transfer device of FIG. 2.

In FIG. 5, a chain 138 has one end thereof mounted on side 126 via anchor 140 with the other end thereof being mounted on side 126 via anchor 142. A sprocket 144 is mounted on the right end of tilt frame 30 and has chain 138 engaged therewith. An hydraulic motor 146 drives a conventional gear box 148 which in turn rotates a shaft 150. The shaft is journaled between a pair of opposed plates 152, 154 attached to tilt frame 30.

Chain 138 is engaged with a sprocket 156 mounted on shaft 150 and with sprockets 158, 160 which are rotatably mounted on plate 154. A similar chain (not visible) is mounted on sprockets 158, 160, 162 opposite tilt frame 30 from chain 138 and is engaged with pull plate assembly 122 in the same fashion as chain 138. Driving hydraulic motor 146 thus turns shaft 150 thereby moving plate assembly 122 along the longitudinal axis of tilt frame 30.

Indicated generally at 164 in FIG. 1 is a stacker transfer conveyor. Conveyor 164 includes a pair of endless chains 166, 168 which are journaled over sprockets (not visible) at each end of the conveyor. The sprockets are driveable in a direction which causes a pallet positioned on conveyor 164 to be shifted laterally onto a second conveyor 170, also including endless chains as shown, which is mounted on a captive pallet stacker indicated generally at 172.

Stacker 172 is substantially identical in structure and operation to shipping pallet dispenser 64; however, stacker 172 operates in reverse. In other words, a stack of captive pallets supported on stacker 172 is lifted by the stacker lift fingers to permit an additional captive pallet to be staged by conveyor 170 to a position beneath the lifted stack thus accumulating pallets on stacker 172 rather than dispensing them as is the case with shipping pallet dispenser 64. Powered rollers 174 stage a stack of captive pallets from stacker 172 toward the free end of rollers 174 where a fork lift picks up the stack and returns the captive pallets to the manufacturing operation where the pallets are again used to stack manufactured products thereon.

Referring now to FIGS. 1 and 2, indicated generally at 176 is a slip sheet feeder. Included thereof is a stack of polymeric slip sheets 178. In the present embodiment of the invention, the slip sheet size can range between 40"×48" which is the same size as pallet 65, up to 56"×44". As will later be seen, the unit loads may be transferred from a captive pallet to a slip sheet for shipping the same. As will also be seen, the slip sheet may be used by itself or may be supported on a shipping pallet.

Slip sheet feeder 176 includes four vacuum cups, one of which is cup 180, supported by a rail assembly 182. The vacuum cups are vertically shiftable relative to slip sheets 178 and are also laterally moveable along the axis of rail assembly 182. Thus, when the vacuum cups, like cup 180, are lowered to contact the upper sheet in stack 178, vacuum may be applied to each of the cups in a conventional manner thus maintaining the top sheet against the bottom side of each cup. When the cups are shifted vertically and moved laterally along rail assembly 182, the sheet so carried may be positioned directly over the pallet, like pallet 65, received on slider bed 68. When the cups are again lowered and the vacuum removed, the slip sheet is positioned on pallet 65.

Turning attention again to FIG. 1, 3B and 4 further consideration will be given to the structure underlying pallet transfer bay 16. A plurality of conveyor rollers 184 are journaled between a pair of upright parallel plates 186, 188. A shaft 190 spans the distance between the plates and is journaled for rotation about its axis on either end. An endless chain 192 is drivingly engaged with sprockets (not visible) on one end of each of conveyor rollers 184 for driving the same. A similar chain is engaged with sprockets mounted on the other ends of rollers 184 and shaft 190. Shaft 190 is driven by a motor and gear box assembly 194 mounted on plate 186 and shown in dashed lines in FIG. 4. Running motor 194 thus rotates rollers 184 in a selected direction thus shifting loads either to the left or right (a viewed in FIG. 1) responsive to roller movement.

A frame 196 is fixedly attached to rails 32, 34 of tilt frame 30 via vertical frame members, two of which are frame members 198, 200. Frame 196 further includes a lower portion 202 which is fixedly attached to the lower ends of frame members 198, 200. Frame 196 thus moves as a unit with tilt frame 30 as in illustrated in FIG. 3B.

Plates 186, 188, and thus rollers 184, are vertically shiftable (in view of FIG. 4) relative to frame 196. Indicated generally at 204 is a vertical shift mechanism for achieving such movement. Included therein are a pair of substantially parallel shafts 206, 208. Each of the shafts extend beneath the lower ends of plates 186, 188 and are mounted on frame 196, each being mounted for rotation about the longitudinal axis thereof. Each shaft includes a pair of pivot arms 210, 212, 214, 216 keyed thereto. The outer ends of arms 210, 216 are linked to blocks 218, 220 via openings therein as shown in FIG. 4. Blocks 218, 220 are fixed to the lower side of plate 188.

A rod 222 has one end thereof pivotally connected to arm 212 and the other arm thereof pivotally connected to arm 214. Rams 224, 226 have their closed cylinder ends joined together as shown with ram 224 having a rod pivotally connected to arm 212. The rod of ram 226 is pivotally connected to a bracket 228 which in turn is fixed to frame 196.

The view of FIG. 4 shows the structure as configured with both rams 224, 226 contracted. When the rod of one ram extends, shaft 206 rotates clockwise, as viewed in FIG. 4, thus causing movement of rod 222 to the left thereby rotating shaft 208, via arm 214, counterclockwise. Arms 210, 216 are thus lifted, thereby lifting plates 186, 188 to a predetermined amount.

If both rams 224, 226 extend, plates 186, 188 raise an additional amount. Thus, rollers 184 are vertically shiftable to three positions: fully lowered with rollers 184 aligned with rollers 232 (with neither ram 224, 226 extended as shown in FIG. 4); fully raised to a position where rollers 184 are just beneath plate 124 (when both rams 224, 226 extend); and a position mid-way between the lowered and raised positions in which rollers 184 are aligned with conveyor rollers 230 (when one of rams 224, 226 extends). As can be seen in FIG. 4, conveyor rollers 230 are fixed to frame 196 at the same level as in-feed conveyor rollers 12. Similarly, conveyor rollers 232 are mounted on frame 196 at the same level as out-feed conveyor rollers 14.

Turning now to FIG. 4A, indicated generally at 233 is an alternate, and preferred, embodiment of the invention. The view of FIG. 4A is similar to that of FIG. 4. Most of the structure identified and described in FIG. 4A is structure which is different from or additional to structure previously described in connection with FIG. 4. The same numerals in FIGS. 4 and 4A identify the same structure.

A pair of sheaves 235, 237 are coaxially mounted on shafts 206, 208, respectively. A chain 239 has the opposing ends thereof journaled over sheaves 235, 237. Each chain end, not visible, is pinned to its associated sheave with chain being wrapped around approximately ⅜ of the circumference of each sheave. A turnbuckle 241 is disposed in the chain between the sheaves.

The embodiment of FIG. 4A operates in much the same manner as described in connection with the embodiment of FIG. 4. Extension of ram 224 rotates shaft 206 in a clockwise direction. As shaft 206 rotates, chain 239 wraps around sheave 235 thereby rotating sheave 237, and thus shaft 208 in a counterclockwise direction. Turnbuckle 241 is adjusted to set the initial (rollers 184 lowered) angular positions of pivot arms 210, 216 so that they are symmetrical. This causes the pivot arms to begin and complete upward movement in a manner which smoothly raises and lowers rollers 184.

Figure 7:
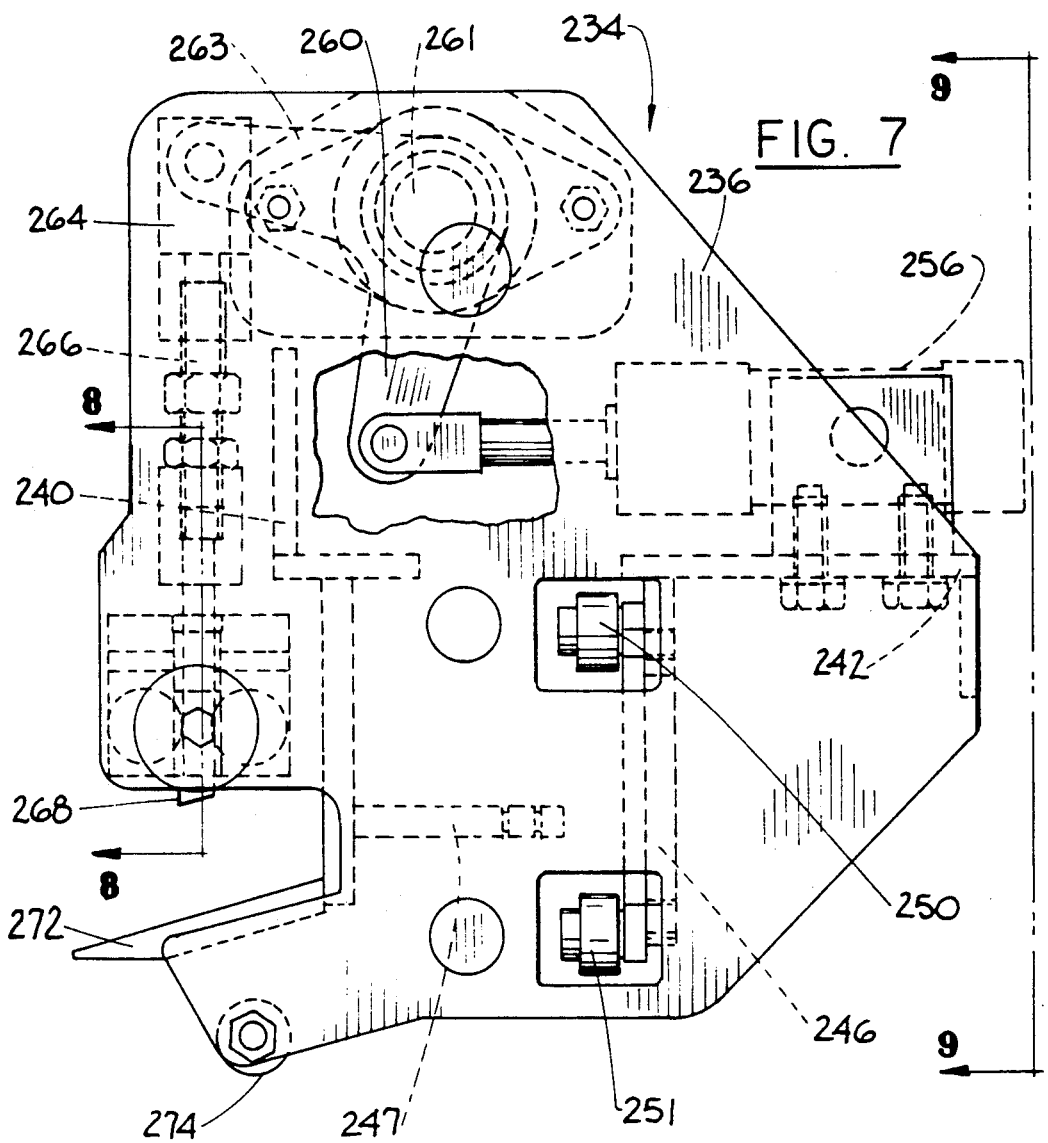
FIG. 7 is an enlarged side elevation view of the gripper frame assembly shown in hidden lines in FIGS. 3B and 3C.
Figure 8:
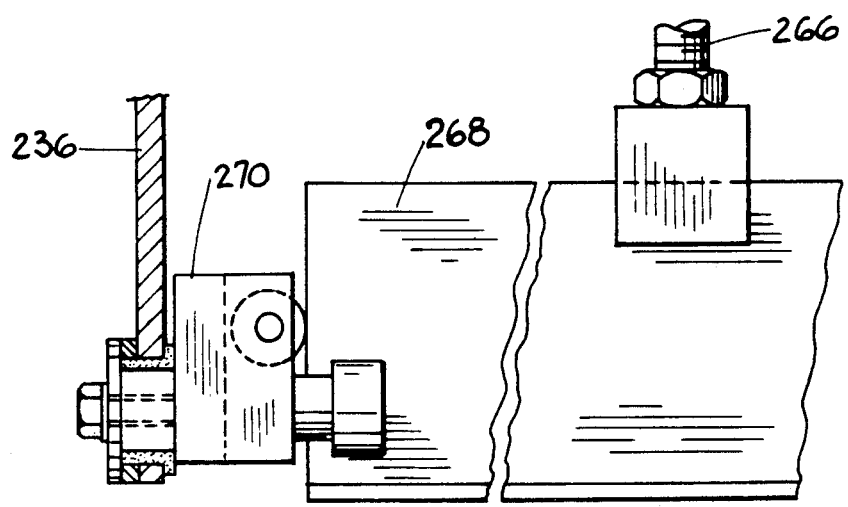
FIG. 8 is an enlarged partial view taken along line 8—8 in FIG. 7.
Figure 9:
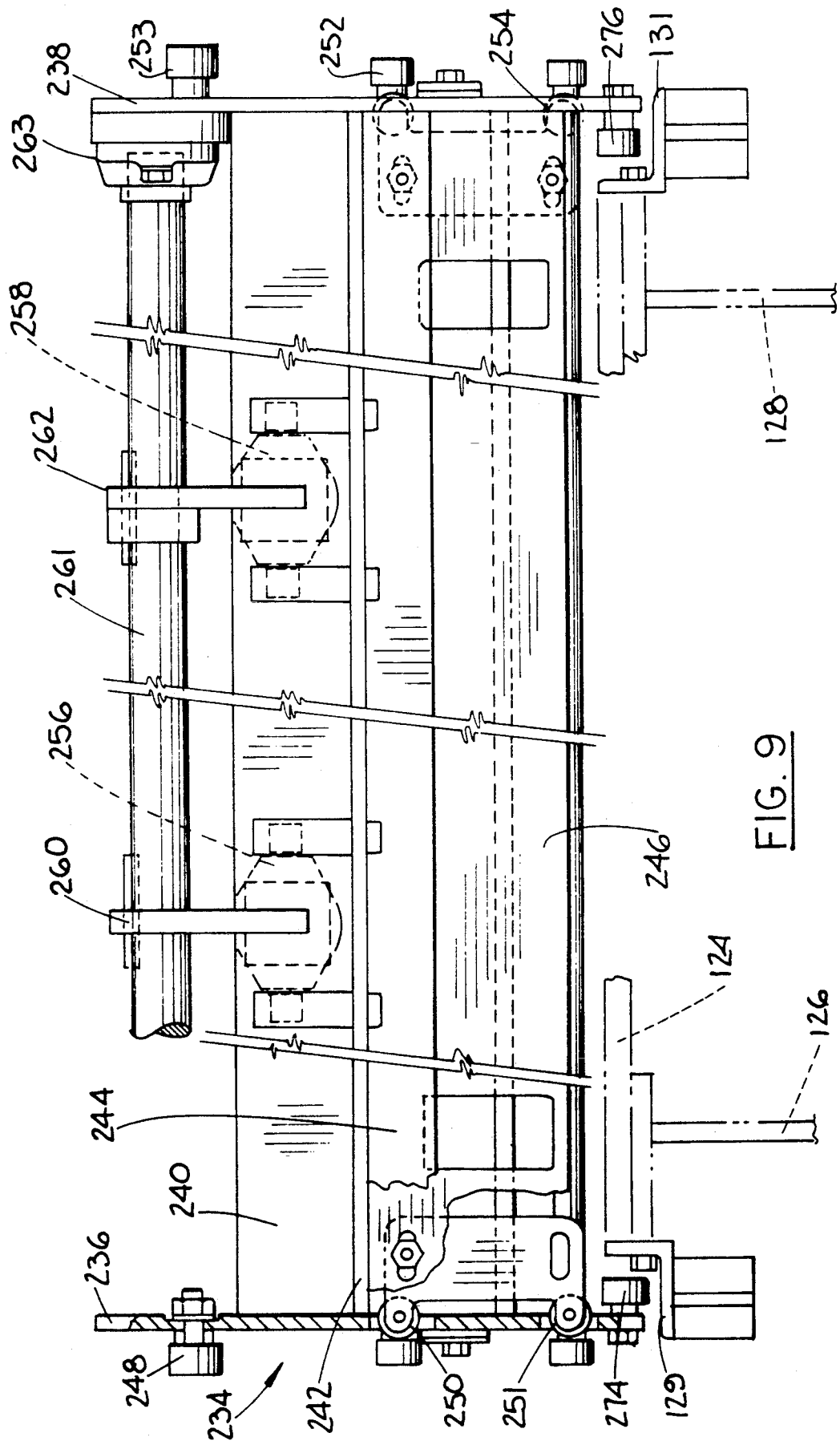
FIG. 9 is a slightly reduced side elevation view of the gripper frame assembly of FIG. 7 taken along line 9—9 in FIG. 7.

Turning now to FIGS. 7, 8 and 9, consideration will be given to the structure of the gripper frame assembly, indicated generally at 234. The gripper frame assembly is mounted on and received in retainer assembly 18. Portions of the gripper frame assembly are also indicated by the numeral 234 in FIG. 3B. Gripper frame assembly 234 includes a pair of opposed parallel gripper frame side plates 236, 238. Several plates 240, 242, 244 (a portion of which is broken away in the view of FIG. 9), 246, 247 are welded to the inner sides of plates 236, 238.

A plurality of cam follower bearings, like bearings 248-14 254, are mounted on the other side of plates 236, 238 and cooperate with structure (not shown in FIGS. 7-9) mounted inside retainer assembly 18 to facilitate movement of the gripper frame relative to the retainer assembly in a manner which is hereinafter described.

Rams 256, 258 are mounted on plates 242 with rods extending horizontally to plate 242 as shown in FIGS. 7 and 8. Each of rams 256, 258 is connected to a 90' link arm 260, 262, respectively. Link arm 260 has the end of one arm pivotally connected to the rod extending from ram 256 while the end of the other arm is pivotally connected to the upper end of a clevis 264. The lower end of clevis 264 is attached to an adjustable-length rod 266. A pinch-bar plate 268 is mounted on the lower end of rod 266 as best viewed in FIG. 8.

A shaft 261 spans the distance between side plates 236, 238 and is journaled for rotation about bearings mounted on the inner surface of the side plates, like bearing 263 is mounted on side plate 238. Each of link arms 260, 262 is keyed to the shaft. An opposed bearing 265 which supports the other end of shaft 261 is shown in FIG. 14. Bearing 265 and the end of shaft 261 it supports are broken away in the view of FIG. 9 to reveal additional structure.

A clamp guide assembly 270 guides pinch-bar 268 when it moves vertically responsive to extension and contraction of rams 256, 258 which operate in tandem. Bar 268 extends from side-to-side of gripper frame 234 and has an end (not visible) adjacent side plate 238 received by a clamp guide assembly, like assembly 270, which is mounted on the inside of plate 238.

A lower jaw plate 272 is mounted on the inside surface of side plates 236, 238 and spans the distance therebetween. Thus, when rams 256, 258 contract, shaft 261 rotates counterclockwise, in the view of FIG. 7, thus moving pinch-bar 268 downwardly until the same is urged against lower jaw 272. As will be later seen in connection with the description of the operation of the present embodiment of the invention, gripper frame 234 grips a slip sheet between pinch-bar 268 and lower jaw 272.

Finishing now the description of gripper frame 234, rollers 274, 276 are mounted on the lower, inside surfaces of plates 236, 238, respectively. Rollers 274, 276 are over roller tracks, 129, 131, respectively and as will later be seen, gripper frame 234 is lowerable to permit rollers 274, 276 to roll on tracks 129, 131 thus facilitating rolling movement of the gripper frame relative to push plate 124.

Figure 10:
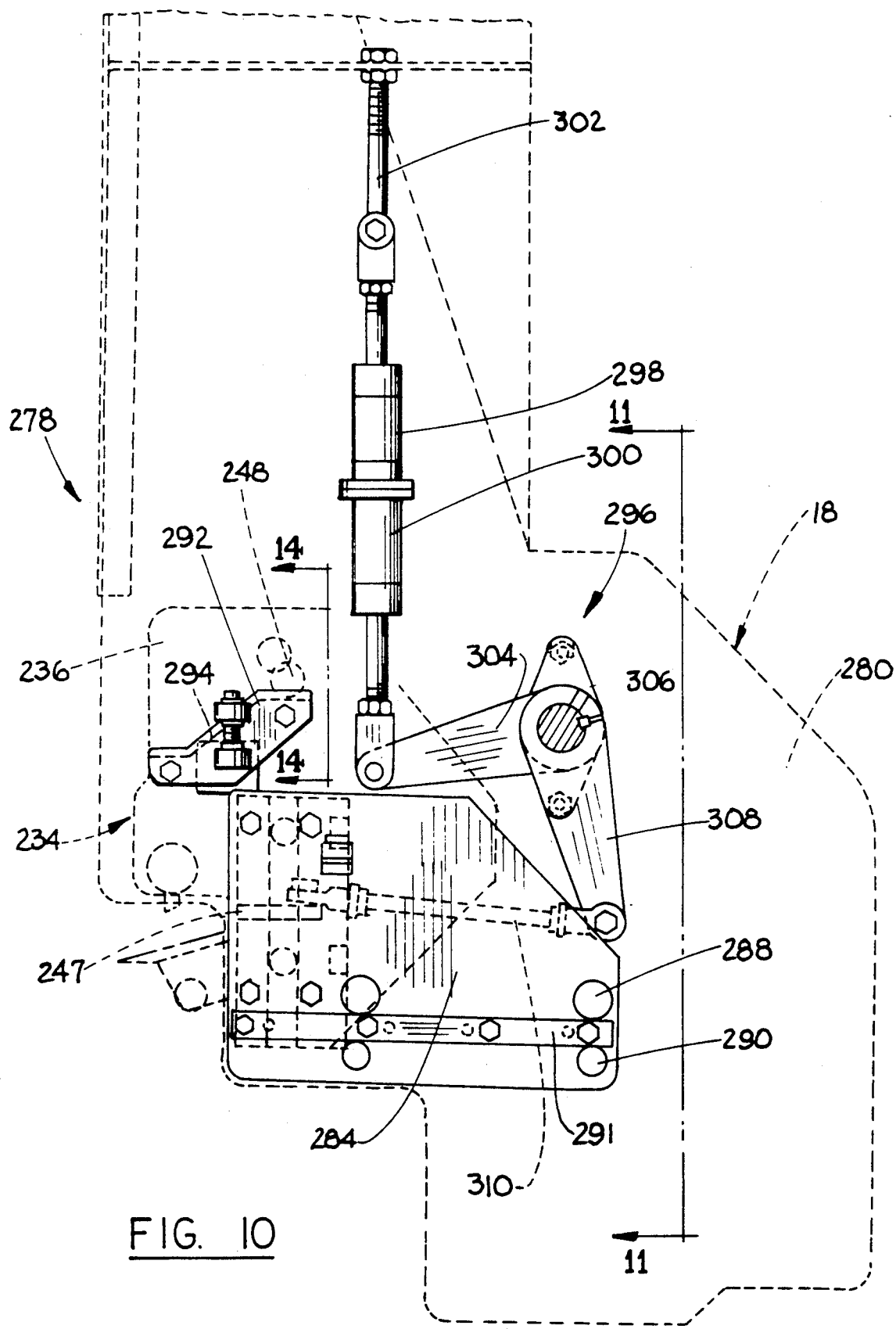
FIG. 10 is a side elevation view of the gripper extension assembly with the gripper of FIG. 7 shown in dashed lines.
Figure 11:
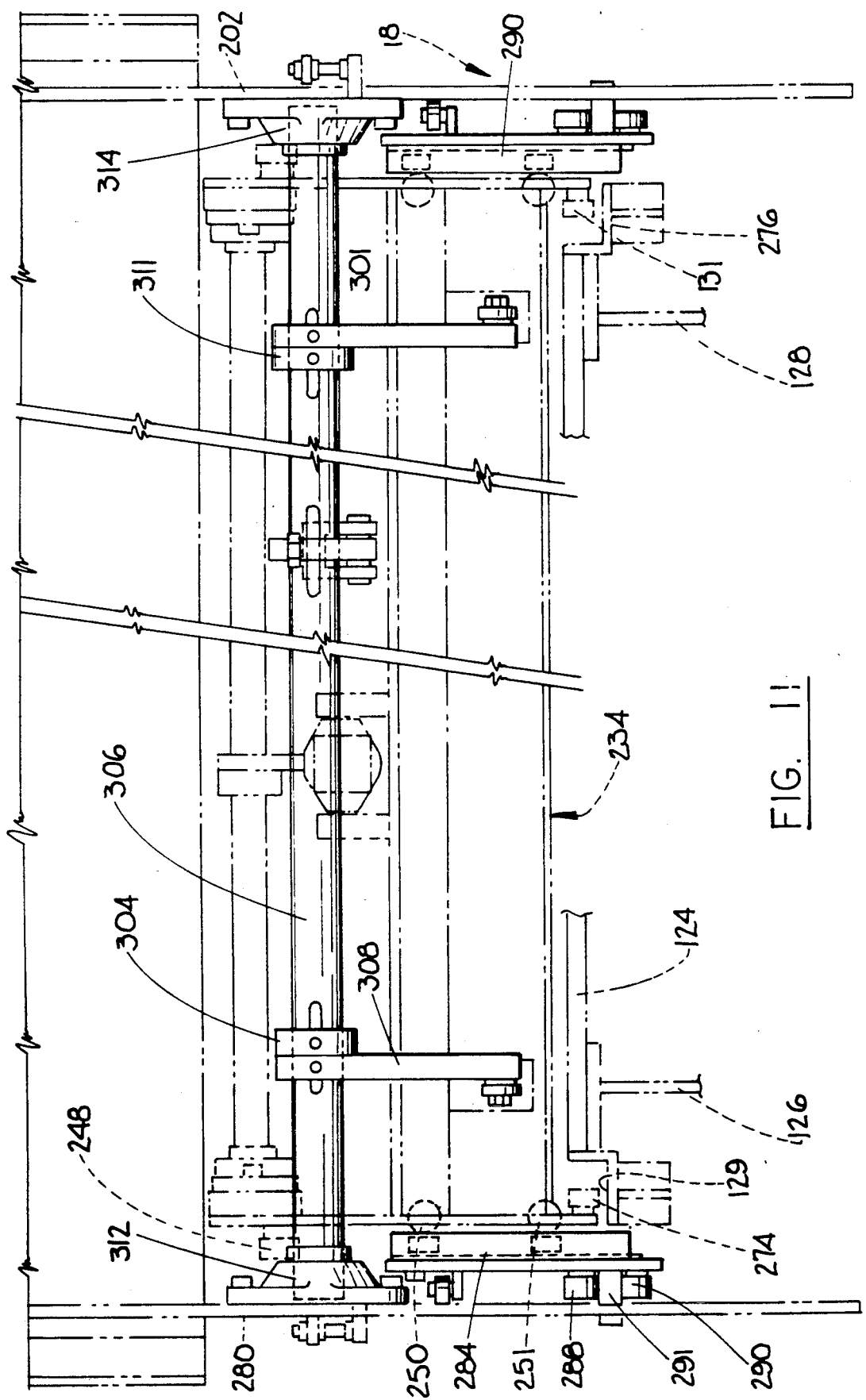
FIG. 11 is a side elevation view of the gripper extension assembly of FIG. 10 taken along line 11—11 in FIG. 10.

Turning now to FIGS. 10, 11 and 14, indicated generally at 278 in solid lines is a gripper retainer/mating assembly. Portions of gripper frame assembly 234 which were described in FIGS. 7, 8 and 9 and retainer assembly 18 are shown in dashed lines. Retainer assembly 18 includes a pair of opposed parallel upright side plates 280, 282. An intermediate plate 284 is mounted via bearing rollers, like rollers 288, 290 in FIGS. 10 and 11, on a roller bar 291, which is mounted on the inner side of plate 280. Intermediate plate 286 is similarly mounted on the inner side of plate 282. Intermediate plates 284, 286 are thus mounted on retainer assembly 18 for lateral movement as viewed in FIG. 10.

A ramp block 292, in FIGS. 10 and 14 is fixedly mounted on the inner surface of plates 280. Roller bearing 248 (shown in solid lines in FIG. 9) is rollingly supported on a track 294 formed on the ramp block. A similar roller bearing, also viewable in FIG. 9, is supported on a track on a ramp block, like block 294, which is mounted on the inner surface of plate 282 symmetrical with block 292. Gripper frame 234 is thus supported by the roller bearings, like roller bearing 248 on each of the ramp blocks.

Bearings 250, 251, in FIG. 11, facilitate vertical movement of gripper frame 234 relative to intermediate plate 284 which, as will be recalled, is moveable horizontally relative to roller bar 291. Thus, as intermediate plates 284, 286 move to the left in FIG. 10, roller bearing 248 rolls down ramp block 292 thus lowering gripper frame 234 as the same moves to the left.

As can be seen in FIG. 11, when push plate assembly 122 is beneath retainer assembly 18, rollers 274, 276 begin to roll on tracks 129, 131, respectively, as roller 248 starts down ramp block 292. When such occurs, lateral movement of gripper retainer/mating assembly along bar 291 may continue in the absence of further downward movement. When such occurs, roller 248 is no longer received on ramp block 292. This aspect of the operation of pallet transfer device 10 is explained further in connection with the description of its operation, especially with reference to FIGS. 23-26.

Indicated generally at 296 is a mechanism for urging gripper frame 234 to the left, as viewed in FIG. 10, and thus leftwardly and downwardly due to the interaction of the rollers, like roller 248, and the ramp blocks, like ramp block 294. Included in mechanism 296 are a pair of rams 298, 300. The rams are connected back-to-back as shown with the rod of ram 298 being connected to a tie rod 302 having its upper end fixed to retainer assembly 18. The rod of ram 300, which extends downwardly therefrom, is pivotally connected to a link arm 304 which in turn is keyed to a shaft 306. A second link arm 308 is keyed to shaft 306 adjacent link arm 304. The free end of link arm 308 is pivotally connected to a tie rod 310 having the other end thereof pivotally connected to plate 247 of gripper frame 234.

As can be seen in FIG. 11, a shaft 306 is journaled between bearings 312, 314 which are mounted on the inner surfaces of plates 280, 282. Additional link arms 309, 311 on shaft 306 are connected to rams (not visible), like rams 298, 300, and to a tie rod, like tie road 310.

It can be seen that contraction of only one of rams 298, 300 causes movement of gripper frame 234 leftward by a preselected amount. Contraction of both of rams 298, 300, and the corresponding other rams (not visible), causes further leftward movement of gripper frame 234 to the left and downwardly (assuming push plate assembly 122 is not positioned beneath gripper frame 234) by an additional preselected amount. Gripper retainer/mating assembly 278 thus has three preselected configurations: the first being as shown in FIG. 10, the second being with one of rams 298, 300 contracted and the third being with both rams 298, 300 contracted.

Consideration will now be given to the operation of pallet transfer device 10. It should be appreciated that there are generally two modes of operation of the device: a first mode when the unit load is supported on a captive pallet having a slip sheet thereon and a second mode when the unit load is supported on a captive pallet only, i.e., without a slip sheet. In the first mode, the unit load of product may be transferred to: (a) a shipping pallet with a slip sheet; or (b) a slip sheet only, i.e., without a shipping pallet. In the second mode, the unit load of product may be transferred to: (a) a shipping pallet without a slip sheet; (b) a shipping pallet with a slip sheet; or (c) a slip sheet only, i.e., without a shipping pallet.

A diagrammatic representation of the transfer process when the unit load is on a captive pallet without a slip sheet (the second mode) is illustrated in FIGS. 15-22. A somewhat diagrammatic set of illustrations in FIGS. 23-26 illustrate the transfer process when the unit load is supported on a captive pallet with a slip sheet (the first mode). It should be noted in the FIGS. 15-22 procedure for transfer without a slip sheet, gripping frame assembly 234 is not utilized and that tilt frame 30 is angulated as illustrated in FIGS. 3A-3C. Conversely, in the procedure illustrated in FIGS. 23-26 for transferring a unit load from a captive pallet having a slip sheet, gripper frame assembly 234 is utilized but tilt frame 30 remains in its lower or horizontal position, illustrated in FIG. 2, throughout the transfer process.

Consideration will first be given to the procedure illustrated in FIGS. 15-22, with reference to the structure described in FIGS. 1-14, for transfer of a unit load 316 from a captive pallet 318, without a slip sheet, to shipping pallet 319.

With reference to FIG. 15, description will first be made of the operation of pallet transfer device 10 when load 316 is transferred to shipping pallet 319 without a slip sheet on shipping pallet 319. In FIG. 1, pallet lift fingers 82-88 in shipping pallet dispenser 64 raise all but the lowermost pallet on a stack (not shown) of pallets supported on dispenser 64 between the fingers. Conveyor 66 then operates to stage the lowermost pallet to the left and the previously described pallet pusher arm (not shown) urges the shipping pallet from the end of conveyor 66 to the position shown in dashed lines for shipping pallet 65. During this process, clamps 100, 102 are tilted forward as illustrated in FIG. 3D while the pallet pushing lugs, like lug 116, are pivoted to the rear, also as illustrated in FIG. 3D. The shipping pallet may thus be received, like shipping pallet 65, between the lugs and the clamps on slider bed 68. When so received, cylinder 110 contracts thereby returning clamp 100 to the position shown in FIG. 3C and ram 118 also contracts thus moving lug 116 against an upright side surface of the shipping pallet as shown for shipping pallet 65 in FIG. 3C. The other lug and clamp 102 also move to the position illustrated in FIG. 3C for clamp 100 and lug 116.

While the shipping pallet is being positioned on slider bed 68, pallet 318 with load 316 thereon, is lifted onto in-feed conveyor 12 by a fork lift (not shown). Conveyor 12 moves pallet 318 and its load to a position just to the left of transfer bay 16 in FIG. 1. Immediately after shipping pallet 319 is positioned on slider bed 68 (as shown for pallet 65), push plate assembly 122 travels generally from a position shown in FIG. 1 to a position over the shipping pallet with the push plate being completely withdrawn from transfer bay 16.

As can be seen in FIG. 4, side plate 126 is received between conveyor rollers 230 and rollers 184 while side plate 128 of push plate assembly 122 is received between rollers 184, 232 thus permitting movement of push plate assembly 122 (on rails 32, 34) into and through transfer bay 16. As will be recalled from FIGS. 5 and 6 such movement is powered by motor 146 via gear box 148.

Prior to pallet 318 and the load supported thereon driving from feed conveyor 12 onto rollers 184, one of rams 224, 226 (in FIG. 4) extends to shift rollers 184 upwardly to the level of rollers 230 thus providing a supporting surface of rollers 184 coplanar with the supporting surface of rollers 230.

When push plate 124 is positioned over shipping pallet 319 as described above, captive pallet 318 (and the load thereon) is staged into transfer bay 16 between retainer assembly 18 and backstop 20 as shown in FIG. 15. Conveyor rollers 184 in the transfer bay stop momentarily after the load is in the bay. Thus push plate then drives, as previously described, into the transfer bay and against the side of the pallet thereby squaring the same and pushing it to within about ¼" of plate 22 in backstop 20.

Figure 2B:
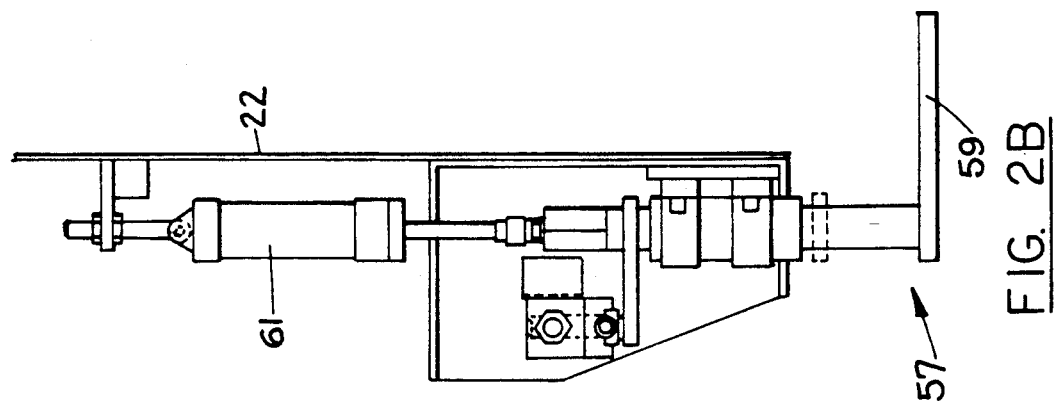
FIG. 2B is a view taken along line 2B—2B in FIG. 2A.
Figure 2A:
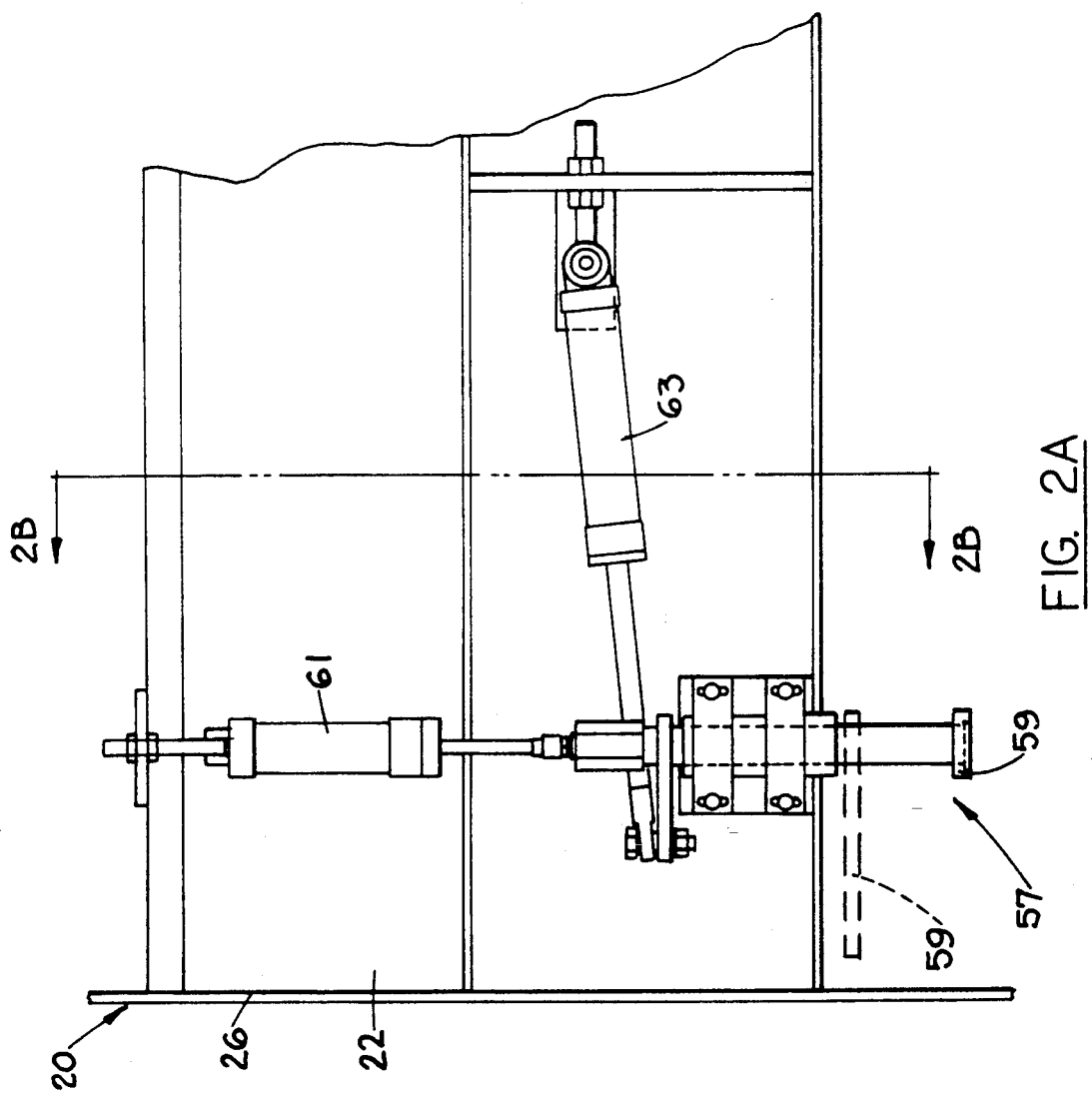
FIG. 2A is an enlarged plan view of a lower portion of the retainer assembly showing the load stop.

Next, rollers 184 again operate and load stop 57 moves into the solid line position thereof illustrated in FIGS. 2A and 2B. The load strikes the load stop, load clamp 67 (in FIG. 1) actuates so that the load is clamped between the arms of the load stop 57 and load clamp 67. Rollers 184 stop rotation leaving the load precisely positioned in transfer bay 16.

Since gripper frame assembly 234 is not used in connection with transfers from captive pallets without slip sheets, gripper frame assembly 234 retains its retracted upper position, illustrated in FIG. 10, throughout the procedure.

When device 10 is configured as illustrated in FIG. 15, push plate assembly 122, including plate 124, and retainer 18 begin leftward movement while tilt frame assembly 30 tilts responsive to lifting action generated in tilt housing 56, in FIG. 3A, as previously described. Thus, the slight lifting of the left end of device 10 in FIG. 16 relative to FIG. 15.

During tilting, the front leading edge of push plate 124 drives into the side of captive pallet 318. The top surfaces of captive pallet 318 and push plate 124 act as first and second support surfaces, respectively, for the unit load. Simultaneously, retainer assembly 18 drives with the push plate to prevent load 316 from moving relative to pallet 318. Load 316 is thus urged against backstop 20 or to a position closely adjacent thereto as illustrated in FIG. 16. Continued movement of plate 124 begins driving pallet 318 from beneath load 316 as illustrated in FIG. 17. Retainer assembly 18 prevents the load from shifting to the right, in FIG. 17, while backstop 20 prevents the load from shifting to the left while pallet 318 is being driven from thereunder. Tilting between angles of 5° and 20° sufficiently change the unit load mass force components, and therefore the frictional resistance movement of the unit load on the first support surface, to facilitate transfer of the load to the second support surface without creasing the containers.

Fingers 27, 29 in FIGS. 1 and 3 prevent the left side of pallet 318 from raising under downward pressure from load 316 as the pallet is driven from beneath the load in FIGS. 17 and 18. As the plate drives the pallet from beneath the load the load transfers so that it is supported on the top surface of plate 124 as illustrated in FIG. 18.

In FIG. 18, shipping pallet 319 begins leftward movement responsive to leftward movement of clamp carriage assembly 94 in FIG. 3C. The pallet pushing lugs, like lug 116, which are received in slots 103, 105 push the trailing edge of the pallet leftwardly thus driving the pallet along the surface of slider bed 68 and onto rollers 184 as illustrated in FIG. 19.

With reference to FIG. 4, it can be seen that clamp assembly carriage 94 and the structure thereon are driveable through a pair of openings in plate 188. Similarly, the clamp sleeves, like clamp sleeve 101, are driveable through slots 103, 105 in slider bed 68 and then through aligned openings formed by spacing adjacent rollers 184 thereby permitting clamp assembly carriage to travel from the position shown in FIG. 3C to a position centered in transfer bay 16 as illustrated in FIG. 19.

After carriage 94 positions shipping pallet beneath rollers 184 as shown in FIG. 19, one of rams 224, 226 in FIG. 4 extends thus raising rollers 184 to the level of rollers 230 and placing the upper surface of shipping pallet 319 directly beneath the lower surface of plate 124. This shift is illustrated between the view of FIG. 19 and FIG. 20.

As leftward movement of plate 124 continues, the trailing tapered edge thereof, viewable in FIG. 5, permits the load to shift onto shipping pallet 319 as illustrated in FIG. 21. The top surfaces of plate 124 and shipping pallet 319 now act as first and second support surfaces, respectively, for the unit load. In FIG. 21 push plate 124 is approximately in the position illustrated in FIG. 1. Continued leftward movement of push plate 124 results in the configuration of FIG. 22. It should be noted that tilt frame 30 drives, after most of the load is transferred in FIG. 21, to its horizontal position as further leftward movement of plate 124 occurs thus resulting in the configuration of FIG. 22.

When so configured, clamps 100, 102 and pallet pushing lugs, like lug 116, pivot to the position shown in FIG. 3D. Rollers 184 responsive to contraction of the extended one of rams 224, 226, return to the configuration of FIG. 4 and shipping pallet 319 and the load thereon are free to be staged under driving action of conveyor rollers 184 onto out-feed conveyor 14. The out-feed conveyor then drives the shipping pallet and its load to the rightmost (as viewed in FIG. 1) side of out-feed conveyor 14. Once so positioned, a fork lift (not shown) transfers the shipping pallet and unit load supported thereon to a shipping vehicle such as a truck. Captive pallet 318 which is ejected from beneath rollers 184 onto stacker transfer conveyor 164, in FIG. 1, is from there conveyed onto conveyor 170 which in turn transports the captive pallet onto captive pallet stacker 172 in a manner previously described herein.

It should be appreciated that the motion of push plate assembly 122, and thus push plate 124, as it travels from the position in FIG. 15 to FIG. 22, in continuous. Once configured as illustrated in FIG. 22, and with shipping pallet 319 and the load thereon staged from transfer bay 16, and push plate 124 retracted to the right, the machine is ready to being another cycle. Beginning the next cycle, a shipping pallet is staged from dispenser 64 onto a slider bed 68 in the position of shipping pallet 65 in FIG. 1 as described above. A unit load on a captive pallet is placed onto in-feed conveyor 12 which conveys the same toward transfer bay 16. Device 10 continues operations in connection with the next transfer as described above. In the present embodiment of the invention, such transfers occur at the rate of approximately one every 60 seconds.

Next, operation of device 10 in connection with transfer of a load 316 on a captive pallet 318 made to a shipping pallet having a slip sheet thereon is described.

With reference to FIG. 1, a shipping pallet, like shipping pallet 65 is staged onto slider bed 68 in the same fashion as described above. While the shipping pallet is so positioned, the vacuum cups, like cup 180 in slip sheet feeder 176 lower to pick up a top slip sheet 178 and transport the same laterally on rail assembly 182 until the slip sheet is over the shipping pallet positioned on slider bed 68. The vacuum cups lower and release the slip sheet as previously described herein onto the top surface of the shipping pallet.

Next, the clamps 100, 102 and the pallet pushing lugs, like lug 116, move from their tilted position shown in FIG. 3D to their upright position in FIG. 3C. Ram 104 then extends, as does the ram controlling clamp 102, thereby lowering the clamps until the upper portion of the clamp compresses against the slip sheet against the top surface of the shipping pallet as illustrated on pallet 65 in FIG. 3C. The slip sheet is thus clamped onto the shipping pallet.

The transfer process proceeds as described in connection with transfer to a shipping pallet without a slip sheet. In other words, after the slip sheet is so positioned on the shipping pallet the transfer occurs as depicted in FIGS. 15-22 and as described above. The clamps prevent the slip sheet from falling off to the right during tilting and from shifting as the load is transferred thereon as illustrated in FIGS. 21 and 22.

After device 10 is configured as shown in FIG. 22, clamps 100, 102 and the lugs, like lug 116, pivot to the position illustrated in FIG. 3D so that the shipping pallet, the slip sheet and load support thereon are staged as described above onto out-feed conveyor 14 and are thereafter transferred by fork lift to a carrier, typically a truck.

A unit load supported on a captive pallet without a slip sheet is thus transferred to a shipping pallet having a slip sheet thereon.

In some circumstances it may be desirable to transfer a unit load from a captive pallet to a slip sheet only. Specialized fork lifts having slip sheet gripping attachments (not shown) are used to handle such loads. When it is desired to make such a transfer, the pallet pushing lugs, like lug 116, remain in their pivoted position as illustrated in FIG. 3D throughout the transfer process. Rather than staging a pallet from dispenser 64 as described above, slip sheet feeder 176 lifts the top slip sheet in the feeder and places the same directly onto slider bed 68 in the same fashion that the slip sheet feeder places a slip sheet on a shipping pallet when one is used. Thereafter clamps 100, 102 each pivot to an upright position (FIG. 3C) and then lower to the position illustrated for clamp 102 in FIG. 4 thereby gripping the leading edge of the slip sheet. The captive pallet is urged from beneath the load as illustrated in FIGS. 15-19 with plate 124 continuing travel from beneath the load as illustrated in FIGS. 20-22.

As plate 124 moves from the position shown in FIGS. 17-19, clamp assembly carriage 94 travels to the left as viewed in FIGS. 3B and 3C, thereby pulling the slip sheet onto rollers 184. As soon as the slip sheet is so positioned, rams 224, 226 both extend thereby shifting rollers 184 to their uppermost position, namely to a point just beneath the lower surface of plate 124. As plate movement continues as illustrated in FIGS. 20-22 the load is shifted onto the slip sheet which is supported by rollers 184 rather than by a shipping pallet as illustrated in FIGS. 20-22.

After the load is fully shifted onto the slip sheet on rollers 184, rams 224, 226 both contract to the configuration of FIG. 4. Rollers 184 are thereby lowered to the level of rollers 232 and out-feed conveyor 14 thus permitting the slip sheet and load supported thereon to be staged to the right-most end of out-feed conveyor 14, as viewed in FIG. 1. Thereafter the slip sheet and load are removed by a fork lift having an attachment for handling a load supported by a slip sheet mounted thereon.

Consideration will now be given to the two modes of operation when the captive pallet, from which a load of product is to be transferred, includes a slip sheet between the product and the top surface of the pallet. In such circumstances, the unit load of product may be transferred to: (a) a shipping pallet with a slip sheet; or (b) a slip sheet only. Consideration will first be given, with reference to FIGS. 23-26, to the manner in which a load on a captive pallet with slip sheet is transferred to a slip sheet only.

Identifying numerals used in previous description of structure depicted in FIGS. 23-26 remain the same. In FIGS. 24-26, a slip sheet 320 is received between a captive pallet 322 and a load 324. Description will first be made of the manner in which the transfer is made to a shipping pallet with a slip sheet.

Initially, retainer assembly 18 moves, under power of ram 41 (in FIG. 3C), slightly forward (to the left in FIG. 3C and to the right in FIG. 23) until it is adjacent conveyor rollers 184 as illustrated in FIG. 23. Gripper frame assembly 234 is in its most retracted and upper position relative to retainer assembly 18, i.e., it is in the position illustrated in FIGs. 10 and 23.

Figure 6:
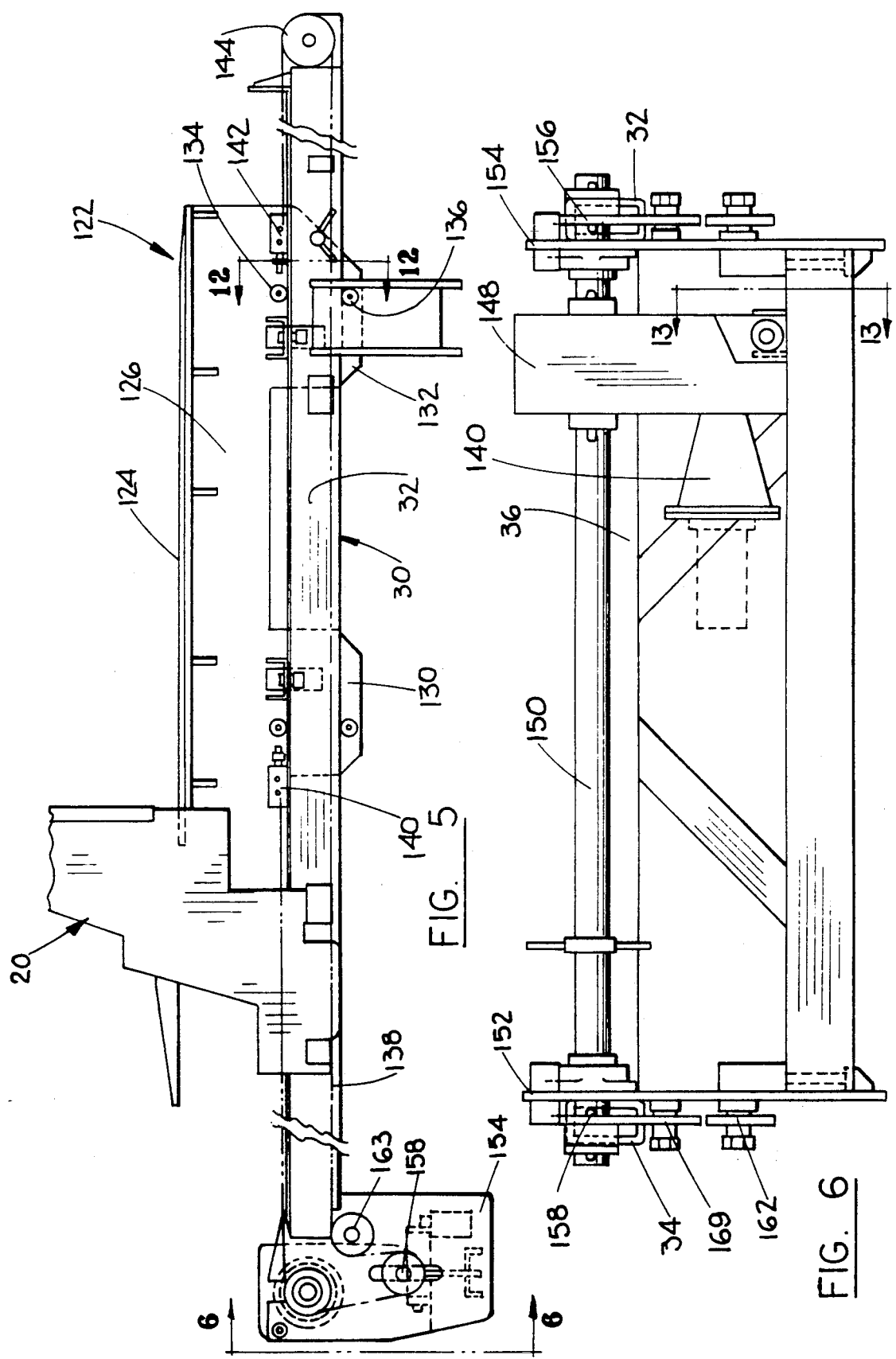
FIG. 6 is a side elevational view taken along line 6—6 in FIG. 5.

After the retainer assembly is so positioned, push plate assembly 122 moves to the right, under power of motor 146 as previously described in connection with FIGS. 5 and 6 to a position in which it extends beyond the upright surface of a retainer wall 18 so that it is closer to conveyor rollers 184, as depicted in FIG. 24, relative to its position in FIG. 23. Thereafter, one of rams 298, 300 (in FIG. 10) contracts thereby partially extending gripper frame assembly 234 beyond the leading edge of retainer assembly 18 as depicted in FIG. 24.

As one of rams 298, 300 contracts, gripper frame assembly 234 moves to the left, in FIG. 10 (to the right in FIG. 23), and bearing 248 begins rolling down ramp track 294. After such movement begins, rollers 274, 276 (in FIG. 9) hit their respective tracks 129, 131 thus preventing further lowering of gripper frame assembly 234. Additional rightward movement (in FIG. 24) occurs because of the continued action of the contracting of one of rams 298, 300 as described in connection with the structure illustrated in FIG. 10. When the ram is fully contracted, gripper frame assembly 234 is in the position illustrated in FIG. 24.

After push plate assembly 122 and gripper frame assembly 234 are positioned as shown in FIG. 24, a captive pallet 322 having a slip sheet 320 and load 324 supported thereon is staged into pallet transfer bay 16 in the same manner as described in connection with FIG. 15. As can be seen in FIG. 24, a lip of slip sheet 320 is received between pinch-bar plate 268 and jaw plate 272 as the load is staged into the transfer bay.

After the pallet and load are staged into transfer bay 16 as illustrated in FIG. 24, push plate assembly 122 again drives to the right thus striking the edge of pallet 322, as illustrated in FIG. 25, thereby squaring the same relative to the push plate and retainer assembly 18. Thereafter, the other of rams 298, 300 (in FIG. 10)

contracts thereby further extending gripper frame 234, to its most extended position, as illustrated in FIG. 25. Next, rams 256, 258 (in FIG. 9) contract thereby driving pinch-bar plate 268 down and pinching slip sheet 320 along one side thereof against jaw plate 272. After so doing, device 10 is in the configuration illustrated in FIG. 25, i.e., gripper frame assembly 234 is in its most extended position, push plate assembly 122 is abutted against the side of pallet 322 and slip sheet 320 is gripped as illustrated.

Next, additional movement of push plate assembly 122 to the right drives pallet 322 to the right, as viewed in FIGS. 25 and 26, thereby driving the captive pallet onto stacker transfer conveyor 164 and load 324 onto the push plate as previously described herein.

After the load and slip sheet are transferred to the top of push plate 124 as illustrated in FIG. 26, conveyor 184 is shifted downwardly to its lowermost position as illustrated in FIG. 4. Clamp assembly carriage 94 is then used as previously described to stage a shipping pallet 326 (without a slip sheet) from slider bed 68 onto rollers 184. Shipping pallet 326 is shown in dashed lines in FIG. 26. One of rams 224, 226 is again extended thereby bringing the top surface of the shipping pallet to a position just beneath the push plate. Continued movement to the right of the push plate shifts the load from the push plate to the top surface of the shipping pallet 326. As can be seen in FIG. 26, plate 124 and track 131 each include a downward extending slope near the trailing edge of the push plate thereby facilitating transfer of the load on the slip sheet from the push plate and onto rollers 184.

After the push plate drivers so that it passes entirely through transfer bay 16, the load supported by the slip sheet remains on rollers 184 which then lower to the level of conveyor rollers 232, as described in connection with FIG. 4. Load 324 and slip sheet 320 then stage from the transfer bay onto out-feed conveyor 14 as previously described.

A unit load supported on a captive pallet with a slip sheet is thus transferred from the captive pallet, with the slip sheet, to a shipping pallet for further handling and shipping.

When the transfer is made to a slip sheet only, clamp assembly carriage 94 is not used and remains in its rearward or home position illustrated in FIG. 3C throughout the transfer process. The procedure is identical to that described in connection with FIGS. 23-25. However, rollers 184 do not move to their lowermost position to receive a shipping pallet from the slider bed. Rather, the rollers move to their uppermost position so that as push plate 124 moves to the right in FIG. 26, load 324 and slip sheet 320 transfer from the top of the push plate to rollers 184. The load and slip sheet then stage to out-feed conveyor 14 for shipment.

A unit load supported on a captive pallet with a slip sheet is thus transferred from the pallet for further handling and shipping with the slip sheet.

Another embodiment with which a unit load 316 is transferred from a captive pallet 318 to a shipping pallet 319 and wherein a tilt frame (not shown) tilts in two directions is illustrated schematically in FIGS. 27-34. This embodiment could be much smaller in size than the previously described embodiment since parts of the transfer device could eliminated. This modification could be easily accomplished by one of ordinary skill in the art and, hence, no detailed description of the changed apparatus is believed necessary.

Figure 27:
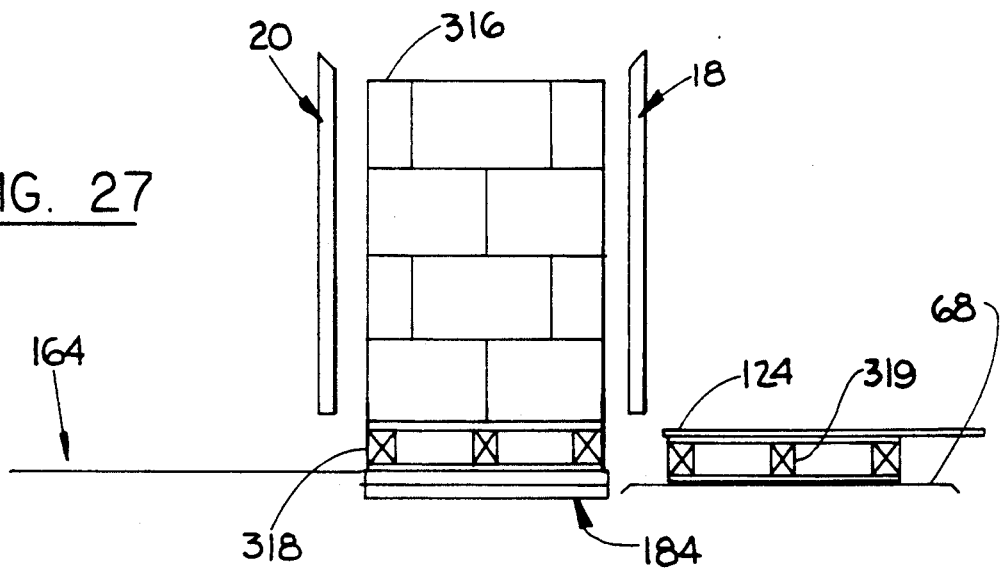
FIGS. 27-34 are sequential schematic depictions of an embodiment of the operation of the pallet load transfer device for transferring a load from a captive pallet, to a shipping pallet where the platform tilts in both directions.

Load 316 along with captive pallet 318 are positioned in transfer bay 16 between retainer assembly 18 and backstop 20 as shown in FIG. 27. A process identical to that previously described in connection with FIG. 15 positions captive pallet 318 (and the load thereon) in transfer bay 16. This positioning can also be achieved by having a fork lift place the captive pallet 318 with load 316 directly in transfer bay 16. After transfer is complete the fork lift returns to transfer bay 16 and picks up shipping pallet 319 (and the load thereon) from the side from which it placed captive pallet 318 into transfer bay 16. With such an arrangement, in-feed conveyor 12 and out-feed conveyor 14 can be eliminated from pallet transfer device 10.

After captive pallet 318 and load 316 have been positioned in transfer bay 16, push plate assembly 122, including plate 124, and retainer 18 begin leftward movement while the tile frame assembly tilts responsive to lifting action generated in tilt housing 56, in FIG. 3A, as previously described.

Figure 28:
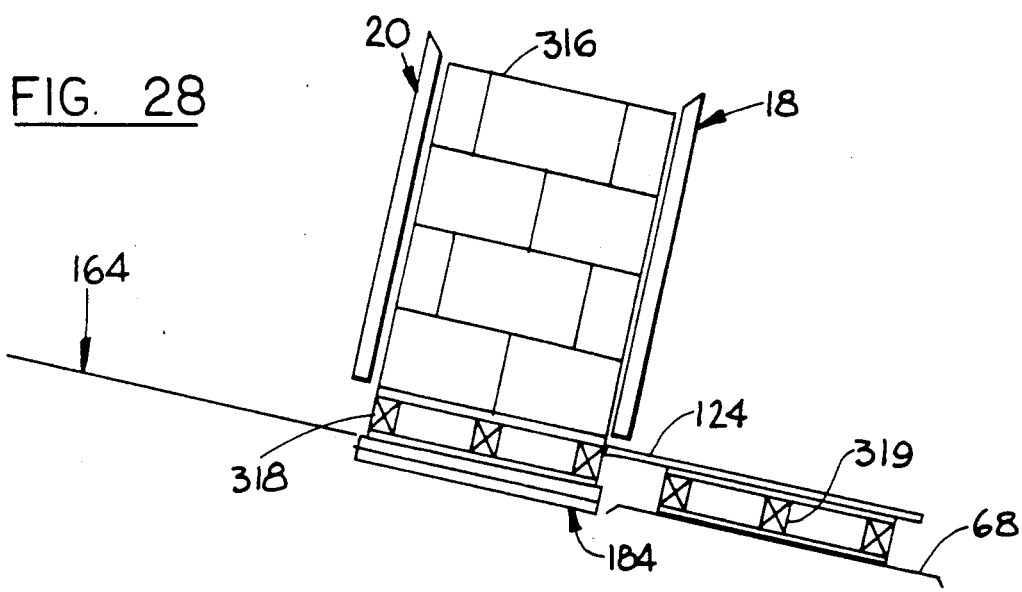
Figure 29:
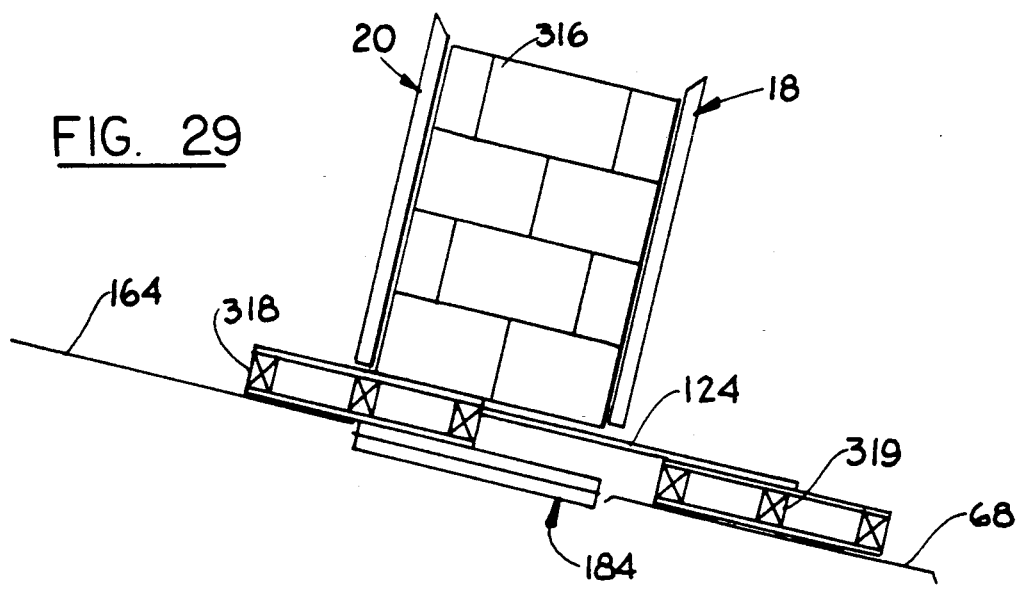

During tilting, the front leading edge of push plate 124 drives into the side of captive pallet 318. Here again, the top surfaces of captive pallet 318 and push plate 124 act as first and second support surfaces, respectively, for the unit load. Simultaneously, retainer assembly 18 drives with push plate to prevent load 316 from moving relative to pallet 318. Load 316 is thus urged against backstop 20 as illustrated in FIG. 28. Continued movement of plate 124 begins driving pallet 318 from beneath load 316 as illustrated in FIG. 29. Retainer assembly 18 prevents the load from shifting to the right, in FIG. 29 while backstop 20 prevents the load from shifting to the left while pallet 318 is being driven from thereunder. As indicated previously, tilting between angles of 5° and 20° sufficiently changes the force components to permit transfer of the load without creasing the containers.

Figure 30:
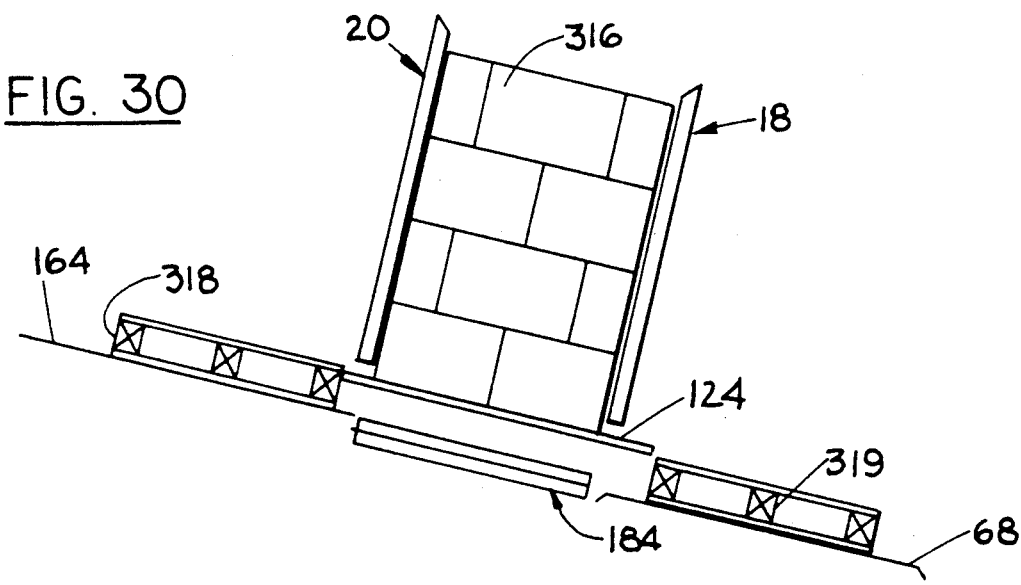

FIGS. 27, 29 in FIGS. 1 and 3 prevent the left side of pallet 318 from raising under downward pressure from load 316 as the pallet is driven from beneath the load in FIG. 29 and 30. As the plate drives the pallet from beneath the load the load transfers so that it is supported on the top surface of plate 124 as illustrated in FIG. 30.

Figure 31:
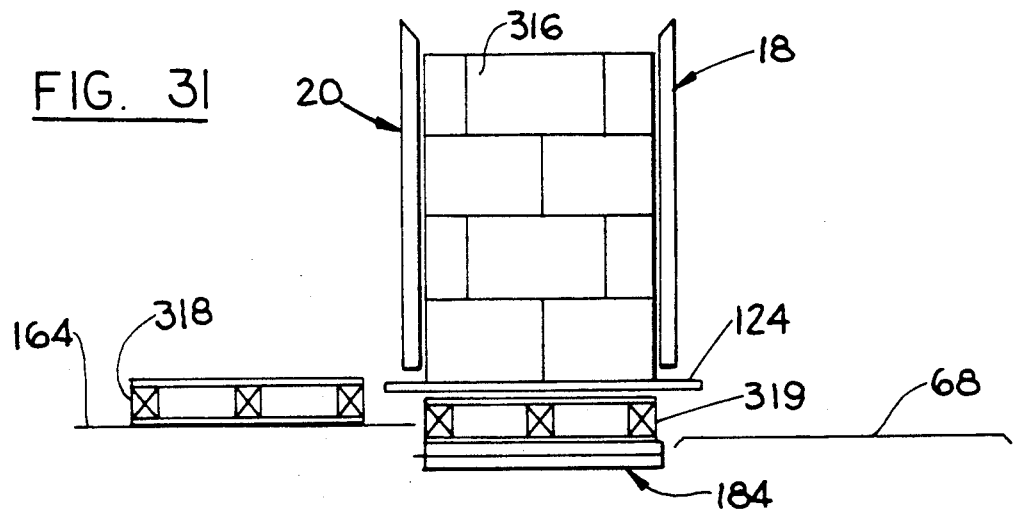

In FIG. 30, shipping pallet 319 begins leftward movement responsive to leftward movement of clamp carriage assembly 94 in FIG. 3C. The pallet pushing lugs, like lug 116, push the trailing edge of the pallet leftwardly thus driving the pallet along the surface of slider bed 68 and onto rollers 184 as illustrated in FIG. 31.

After carriage 94 positions shipping pallet beneath rollers 184, one of rams 224, 226 in FIG. 4 extends thus raising rollers 184 to the level of rollers 230 and placing the upper surface of shipping pallet 319 directly beneath the lower surface of plate 124.

Figure 32:
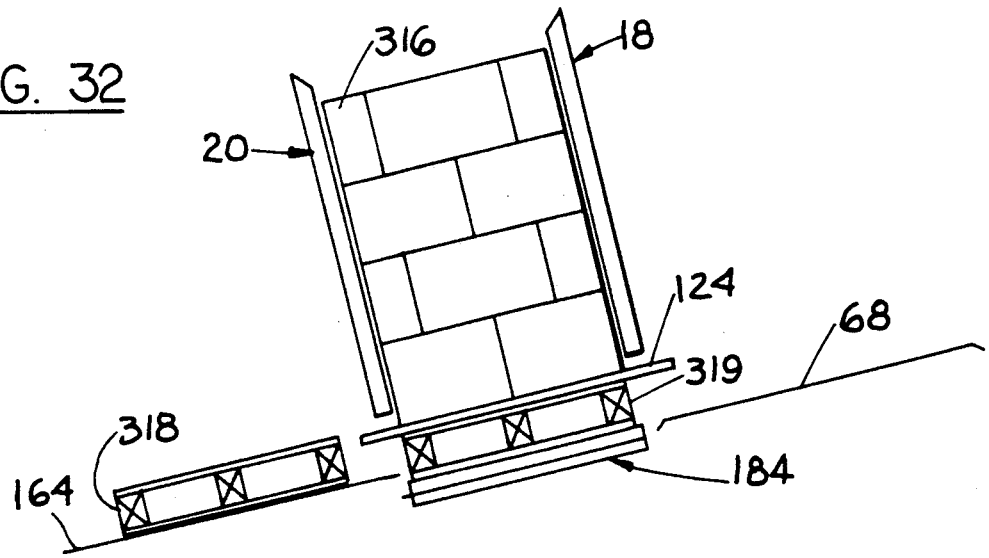

As shipping pallet 319 is being positioned below plate 124 the left end of the tilt frame is lowered through the horizontal to a second tilt position in FIG. 32. In this position load 316 is still prevented from moving by retainer assembly 18 and backstop 20.

Figure 33:
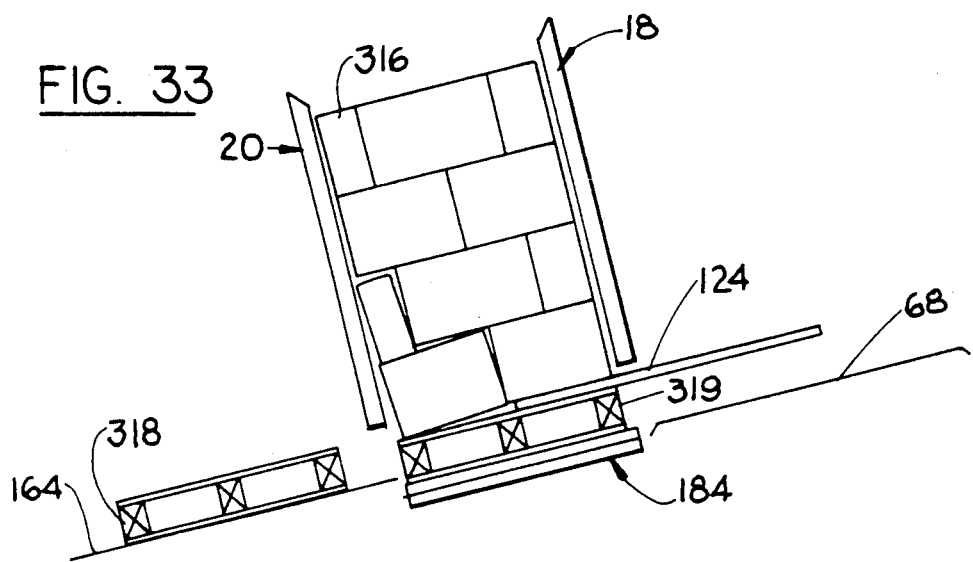
Figure 34:
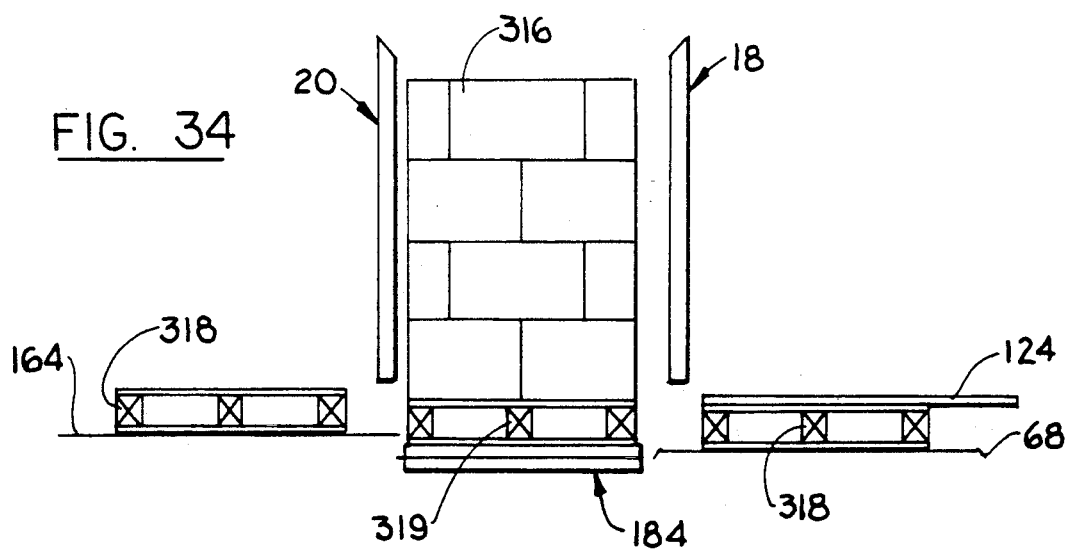

Plate 124 now begins a rightward movement from beneath load 316. As movement continues, the load begins to shift onto shipping pallet 319 as illustrated in FIG. 33. As in the first described embodiment, the top surface of plate 124 and shipping pallet 319 act as first and second support surfaces, respectively, for the unit load in this phase of the transfer. After most of the load has been transferred, the tilt frame elevates to its horizontal position as further rightward movement of plate 124 occurs, thus resulting in the configuration of FIG. 34.

The shipping pallet 319 and the load 316 thereon are staged onto out-feed conveyor 14. Once so positioned, a fork lift (not shown) transfers the shipping pallet and unit load supported thereon to a shipping vehicle. If out-feed conveyor 14 has been eliminated a fork lift will return to transfer bay 16 and pick up the load. Captive pallet 318, which is ejected from beneath rollers 184 onto stacker transfer conveyor 164, FIG. 1, is from there conveyed onto conveyor 170 which in turn transports the captive pallet onto captive pallet stacker 172 in a manner previously described herein. The machine is now ready to begin another cycle. Preparing for the next cycle, a shipping pallet is staged from dispenser 64 onto a slider bed 68 in the position of shipping pallet 65 in FIG. 1 as described above.

Having illustrated and described the principles of our invention in a preferred embodiment thereof, it should be readily apparent to those skilled in the art that the invention can be modified in arrangement and detail in many ways without departing from such principles. For example, both the single and double tilting transfer devices could be designed to provide a transfer of the unit load from captive pallet 318 directly to shipping pallet 319, rather than use an intermediate transfer to pusher plate 124. Another example is that the unit load could be pushed while the captive pallet is held stationary in order to produce the relative motion therebetween. We claim all modifications coming within the spirit and scope of the accompanying claims.

What is claimed is:

1. An apparatus for transferring a unit load from a first support surface to a second support surface, said apparatus comprising:
   (a) a platform having two ends, said platform being associated with both of said support surfaces and adapted to maintain a generally parallel, adjacent and aligned relationship therebetween, the platform being selectively moveable about a horizontal axis generally parallel to one side of the unit load, between a horizontal position and a tilted position wherein one end of said platform is lower than the other end, and wherein said first support surface is higher than said second support surface; and
   (b) a pushing means operative when the platform is tilted, said pushing means being adapted to cause relative movement of the unit load, with respect to said first support surface, in a direction towards the lower end of the tilted platform, said unit load being transferred onto said second support surface as said unit load moves off the lower end of said first support surface.

2. An apparatus according to claim 1 wherein the tiled position of the platform is in the range of between about 5° and about 20° relative to horizontal.

3. An apparatus according to claim 2 wherein said axis lies intermediate said two ends of said platform and either end of the platform can be elevated to establish the tilted position of the platform.

4. The apparatus of any one of claims 1-3 in which the pushing means moves the first support surface from beneath the unit load while the unit load remains stationary.

5. The apparatus of claim 4 in which said first and second support surfaces are generally coplanar.

6. The apparatus of claim 4 in which said second support surface directly underlies said first support surface.

7. The apparatus of any one of claims 1-3 in which the pushing means moves the unit load while the first support surface remains stationary.

8. The apparatus of claim 7 in which said first and second support surfaces are generally coplanar.

9. The apparatus of claim 7 in which said second support surface directly underlies said first support surface.

10. The apparatus of any of claims 1-3 in which the first support surface is a top surface of a pallet.

11. The apparatus of claim 10 in which the second support surface is an upwardly oriented face on the pushing means.

12. The apparatus of claim 10 in which the first support surface is an upwardly oriented face on the pushing means.

13. The apparatus of claim 10 in which the second support surface is a top surface of a pallet.

14. An apparatus for transferring a unit load from a captive pallet to a shipping pallet, said pallets having upper and lower surfaces, said apparatus comprising:
   (a) a platform with two ends, said platform being associated with both pallets and adapted to maintain the upper surfaces thereof in a generally coplanar, parallel, adjacent and aligned relationship, the platform being selectively moveable about a horizontal axis generally parallel to one side of the unit load, between a horizontal position and a tilted position wherein one end of said platform is lower than the other end, and wherein the upper surface of said captive pallet is higher than that of said shipping pallet; and
   (b) pushing means operative when the platform is tilted, said pushing means being adapted to cause relative movement of the unit load, with respect to said first support surface, in a direction towards the lower end of the tilted platform, said unit load being transferred to said shipping pallet as said unit load moves off the lower end of said captive pallet.

15. An apparatus according to claim 14 wherein the tilted position of the platform is in the range of between about 5° and about 20° relative to horizontal.

16. An apparatus according to claim 15 wherein said axis lies intermediate said two ends of said platform and either end of the platform can be elevated to establish the tiled position of the platform.

17. A method for transferring a unit load from a first support surface having two ends to a second support surface, said method comprising:
   (a) positioning said first support surface and said second support surface on a platform having two ends, said support surfaces being such that they are parallel, adjacent and aligned;
   (b) moving the platform about a horizontal axis generally parallel to one side of the unit load to a tilted position in which one end of said first support surface is lower than the other end, and wherein said first support surface is higher than said second support surface; and
   (c) applying a dynamic force generally perpendicular to the axis and generally parallel to the platform, to either the unit load or said first support surface to cause relative movement of the unit load, with respect to said first support surface, to effect the transfer of the unit load from the lower end of said first support surface to said second support surface, the force required to produce such relative movement being reduced by the tilting as contrasted with that which would be required in a horizontal plane.

18. A method according to claim 17 wherein the tilted position of the platform is in the range of between about 5° and about 20° relative to horizontal.

19. A method according to claim 18 wherein said axis lies intermediate said two ends of said platform and either end of the platform can be elevated to establish the tilted position of the platform.

* * * * *

UNITED STATES PATENT AND TRADEMARK OFFICE
CERTIFICATE OF CORRECTION

PATENT NO. : 5,102,282
DATED : April 7, 1992
INVENTOR(S) : H. Basil Maddox

It is certified that error appears in the above-identified patent and that said Letters Patent is hereby corrected as shown below:

On the Title page, item [56], delete "5,606,690 8/1986 Svendsen"
  Column 4, line 26, "liens" should read -- lines -- .
  Column 6, line 23, "ring" should read -- right -- .
  Column 6, line 64, "to" should read -- so -- .
  Column 8, line 57, "a" should read -- as -- .
  Column 8, line 64, "in" should read -- is -- .
  Column 10, line 6, "248-14 254" should read -- 248-254 -- .
  Column 10, line 6, "other" should read -- outer -- .
  Column 11, lines 2-3, "baring" should read -- bearing -- .
  Column 11, line 48, "road" should read -- rod -- .
  Column 13, line 14, "Thus" should read -- The -- .
  Column 17, line 33, "drivers" should read -- drives -- .
  Column 17, line 65, after "could" insert -- be -- .
  Column 18, line 18, "tile" should read -- tilt -- .
  Column 18, line 38, "FIGS." should read -- Fingers -- .
  Column 20, line 36, after (b) insert -- a -- .
  Column 20, line 49, "tiled" should read -- tilted -- .

Signed and Sealed this

Twentieth Day of July, 1993

Attest:

MICHAEL K. KIRK

Attesting Officer

Acting Commissioner of Patents and Trademarks